(12) United States Patent
Shah et al.

(10) Patent No.: US 12,445,959 B2
(45) Date of Patent: Oct. 14, 2025

(54) TRANSCEIVER DEVICE AND SCHEDULING DEVICE

(71) Applicant: Panasonic Intellectual Property Corporation of America, Torrance, CA (US)

(72) Inventors: Rikin Shah, Langen (DE); Ming-Hung Tao, Langen (DE); Ankit Bhamri, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 82 days.

(21) Appl. No.: 17/547,048

(22) Filed: Dec. 9, 2021

(65) Prior Publication Data

US 2022/0104124 A1   Mar. 31, 2022

Related U.S. Application Data

(63) Continuation of application No. PCT/EP2020/062458, filed on May 5, 2020.

(30) Foreign Application Priority Data

Jun. 14, 2019   (EP) .................................... 19180303

(51) Int. Cl.
*H04W 52/02*   (2009.01)
*H04W 72/1263*   (2023.01)
*H04W 72/566*   (2023.01)

(52) U.S. Cl.
CPC ... *H04W 52/0216* (2013.01); *H04W 52/0232* (2013.01); *H04W 72/1263* (2013.01); *H04W 72/569* (2023.01)

(58) Field of Classification Search
CPC ......... H04W 52/0216; H04W 52/0232; H04W 72/1263; H04W 72/569; H04W 76/28; Y02D 30/70
See application file for complete search history.

(56) References Cited

U.S. PATENT DOCUMENTS

2011/0059745 A1   3/2011   Yi et al.
2014/0185558 A1   7/2014   Yi et al.
(Continued)

FOREIGN PATENT DOCUMENTS

| CN | 102256321 A | 11/2011 |
| CN | 106535336 A | 3/2017 |

(Continued)

OTHER PUBLICATIONS

3GPP, "3$^{rd}$ Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.5.0, Mar. 2019. (131 pages).

(Continued)

*Primary Examiner* — Robert C Scheibel
(74) *Attorney, Agent, or Firm* — Seed Intellectual Property Law Group LLP

(57) ABSTRACT

The present disclosure provides a transceiver device and a scheduling device, and communication methods for transceiver device and scheduling device. The transceiver device comprises a transceiver, which, in operation, transmits a scheduling request for scheduling data over a physical uplink control channel, PUCCH; and circuitry, which, in operation, initiates a monitoring sleeping timer after the transceiver transmitted the scheduling request, wherein the transceiver, in operation, does not monitor a physical downlink control channel, PDCCH, while the monitoring sleeping timer is running, and starts monitoring the PDCCH for (Continued)

resource allocation for the scheduling data when the monitoring sleeping timer has expired.

16 Claims, 13 Drawing Sheets

(56) References Cited

U.S. PATENT DOCUMENTS

| | | | |
|---|---|---|---|
| 2015/0188670 A1 | 7/2015 | Lee et al. | |
| 2015/0201456 A1* | 7/2015 | Lee | H04W 72/21 |
| | | | 370/311 |
| 2017/0202054 A1 | 7/2017 | Rathonyi et al. | |
| 2021/0014028 A1* | 1/2021 | You | H04L 5/0055 |
| 2022/0007455 A1* | 1/2022 | Hong | H04W 76/28 |

FOREIGN PATENT DOCUMENTS

| | | | | |
|---|---|---|---|---|
| CN | 108064087 A | 5/2018 | | |
| JP | 2013504247 A | 2/2013 | | |
| JP | 2019505120 A | 2/2019 | | |
| KR | 20090084701 A | 8/2009 | | |
| WO | 2012013215 A1 | 2/2012 | | |
| WO | WO-2013074015 A1 * | 5/2013 | ........ | H04W 52/0216 |

OTHER PUBLICATIONS

3GPP, "3$^{rd}$ Generation Partnership Project; Technical Specification Group Radio Access Network; Evolved Universal Terrestrial Radio Access (E-UTRA); Radio Resource Control (RRC); Protocol Specification (Release 15)," 3GPP TS 36.331 V15.5.1, Apr. 2019. (948 pages).
3GPP, "3$^{rd}$ Generation Partnership Project; Technical Specification Group Radio Access Network; NR; Radio Resource Control (RRC) protocol specification (Release 15)," 3GPP TS 38.331 V15.4.0, Dec. 2018. (474 pages).
3GPP, "3$^{rd}$ Generation Partnership Project; Technical Specification Group Radio Access Network; Evolved Universal Terrestrial Radio Access (E-UTRA); User Equipment (UE) procedures in idle mode (Release 15)," 3GPP TS 36.304 V15.3.0, Mar. 2019. (55 pages).
3GPP, "3$^{rd}$ Generation Partnership Project; Technical Specification Group Radio Access Network; NR; Medium Access Control (MAC) protocol specification (Release 15)," 3GPP TR 38.321 V15.4.0, Dec. 2018. (77 pages).
3GPP, "3$^{rd}$ Generation Partnership Project; Technical Specification Group Radio Access Network; NR; Medium Access Control (MAC) protocol specification (Release 15)," 3GPP TS 38.321 V15.5.0, Mar. 2019. (78 pages).
Extended European Search Report, dated Nov. 4, 2019, for European Application No. 19180303.0-1219. (9 pages).
International Search Report, mailed Jul. 22, 2020, for International Application No. PCT/EP2020/062458. (3 pages).
Japanese Notice of Reasons for Rejection dated Jun. 18, 2024, for the corresponding Japanese Patent Application No. 2021-573947, 12 pages. (With English Translation).
Ericsson, ST-Ericsson, "DRX during UL scheduling," Tdoc R2-121516, Agenda Item: 7.2.1, 3GPP TSG-RAN WG2 #77bis, Jeju, South Korea, Mar. 26-30, 2012. (4 pages).
Khan, "Impact of DRX on VoIP Performance and Battery Life in LTE," Thesis, Blekinge Institute of Technology, School of Engineering, Department of Telecommunication Systems, 2009. (63 pages).
LG Electronics, "Considerations on power saving for NR," R1-1900602, Agenda Item: 7.2.9.4, 3GPP TSG RAN WG1 Ah-Hoc Meeting 1901, Taipei, Taiwan, Jan. 21-25, 2019. (5 pages).
LG Electronics, "Discussions on triggering signaling for UE power saving," R1-1810308, Agenda Item: 7.2.9.2.2, 3GPP TSG RAN WG1 #94-bis, Chengdu, China, Oct. 8-12, 2018. (5 pages).
Ericsson, "SPS and SR in DRX," Tdoc R2-1713470, Agenda Item: 10.3.1.10, 3GPP TSG-RAN WG2 #100, Reno, Nevada, USA, Oct. 27-Dec. 1, 2017. (3 pages).
Notification of Fulfilling of Registration Formality, dated Aug. 22, 2024, for Chinese Application No. 202080039886.4. (7 pages) (with English Translation).
Shen et al., "Method of Discontinuous Reception in LTE," *Idea Engineering, Information Terminal & Display* 36(15): 56-58, DOI:10. 16280/j.videoe.2012.15.004, downloaded Apr. 15, 2012.

* cited by examiner

TRANSCEIVER DEVICE AND SCHEDULING DEVICE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in spectrum ranging from sub-1 GHz to millimeter wave bands. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates providing flexible and power consumption reducing scheduling requests.

In an embodiment, the techniques disclosed herein feature a transceiver device, comprising a transceiver, which, in operation, transmits a scheduling request for scheduling data over a physical uplink control channel, PUCCH; and circuitry, which, in operation, initiates a monitoring sleeping timer after the transceiver transmitted the scheduling request, wherein the transceiver, in operation, does not monitor a physical downlink control channel, PDCCH, while the monitoring sleeping timer is running, and starts monitoring the PDCCH for resource allocation for the scheduling data when the monitoring sleeping timer has expired.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

5G NR System Architecture and Protocol Stacks

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of smartphones.

Figure 1:
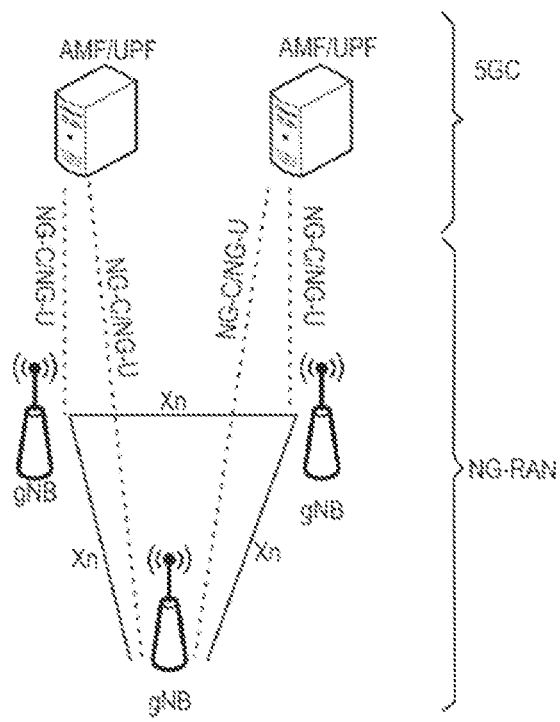
FIG. 1 is a schematic drawing showing an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1.

Figure 2:
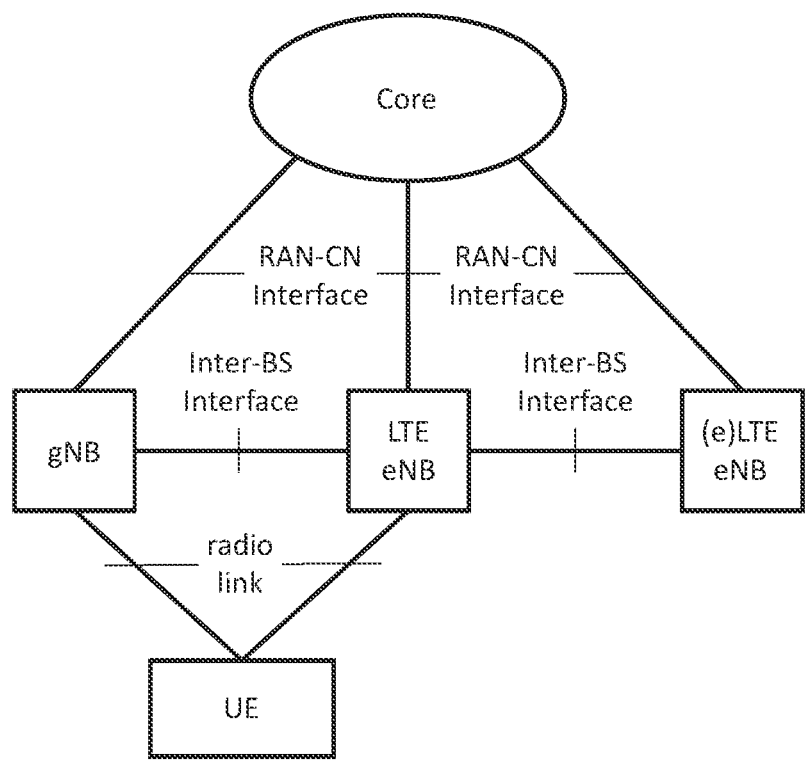
FIG. 2 is a block diagram which shows an exemplary user and control plane architecture for the LTE eNB, gNB, and UE.

Various different deployment scenarios can be supported. For instance, a non-centralized deployment scenario is presented therein, where base stations supporting the 5G NR can be deployed. FIG. 2 illustrates an exemplary non-centralized deployment scenario, while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR comprises the PDCP (Packet Data Convergence Protocol,), RLC (Radio Link Control) and MAC (Medium Access Control) sublayers, which are terminated in the gNB on the network side. Additionally, a new access stratum (AS) sublayer (SDAP, Service Data Adaptation Protocol) is introduced above PDCP. A control plane protocol stack is also defined for NR.

5G NR Functional Split Between NG-RAN and 5GC

Figure 3:
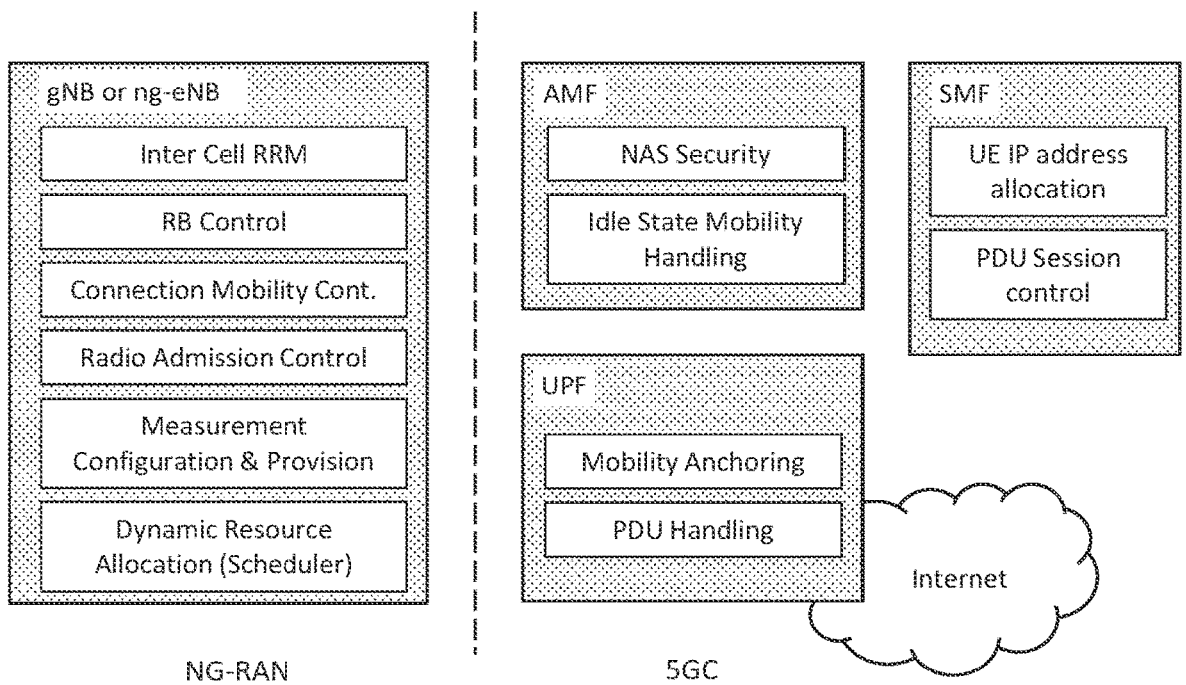
FIG. 3 is a schematic drawing which shows functional split between NG-RAN and 5GC.

FIG. 3 illustrates functional split between NG-RAN and 5GC. NG-RAN logical node is an gNB or ng-eNB. The 5GC has logical nodes AMF, UPF and SMF mentioned above.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signaling termination;

NAS signaling security;

Access Stratum, AS, Security control;

Inter Core Network, CN, node signaling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g., packet filtering, gating, UL/DL rate enforcement;

Uplink Traffic verification (SDF to QoS flow mapping);

Downlink packet buffering and downlink data notification triggering.

Finally, the Session Management function, SMF, hosts the following main functions:
Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 4:
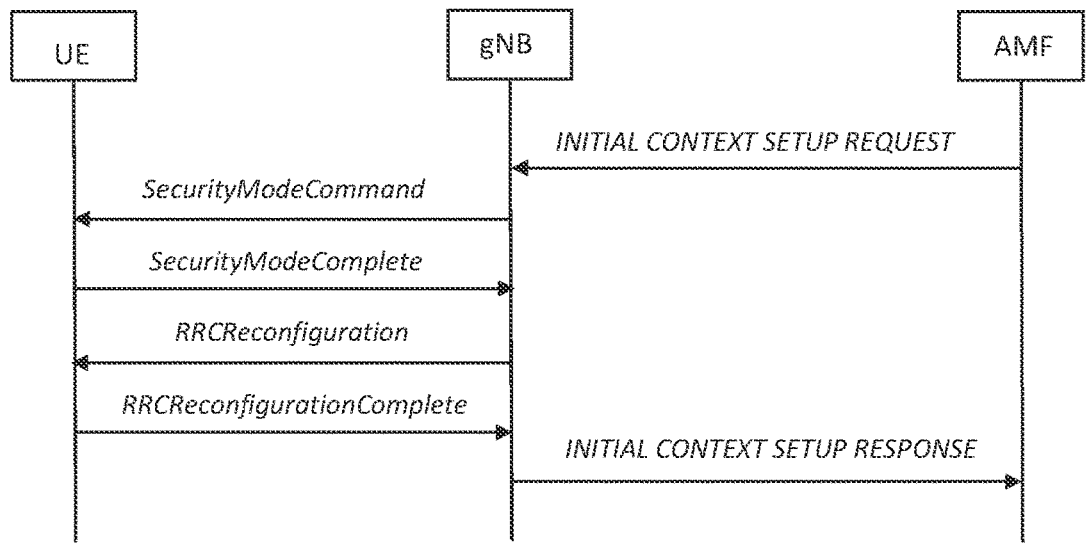
FIG. 4 is a sequence diagram for RRC connection setup/reconfiguration procedures.

FIG. 4 illustrates some interactions between a UE, gNB, and AMF (an 5GC entity) regarding RRC is a higher layer signaling (protocol) used for UE and gNB configuration. In particular, the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by gNB transmitting to the UE SecurityModeCommand message and UE responding to the gNB with the SecurityModeComplete message. Afterwards, the gNB performs the reconfiguration to setup Signaling Radio Bearer 2, SRB2, and Data Radio Bearer(s), DRB(s) by means of RRCReconfiguration and RRCReconfigurationComplete. For signaling only connection, step 8 is skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
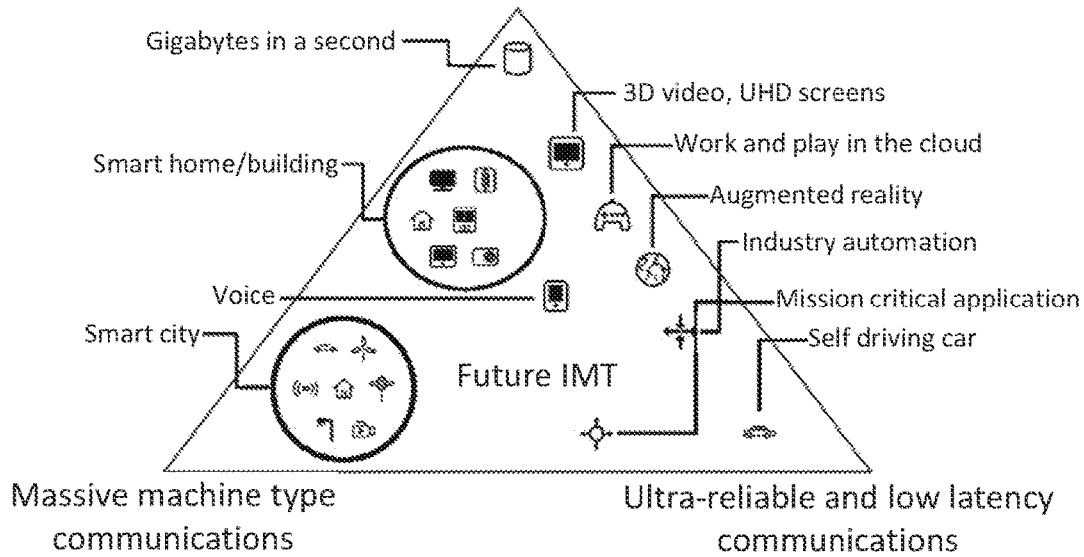
FIG. 5 is a schematic drawing showing usage scenarios of Enhanced mobile broadband, Massive Machine Type Communications (mMTC) and Ultra Reliable and Low Latency Communications (URLLC)

FIG. 5 illustrates some of the use cases for 5G NR. In 3rd generation partnership project new radio (3GPP NR), three use cases are being considered that have been envisaged to support wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. It is supported that the ultra-reliability for URLLC by identifying the techniques to meet the requirements set by TR 38.913. For NR URLCC in Release 15, key requirements include a target user plane latency of 0.5 ms for UL (uplink) and 0.5 ms for DL (downlink). The general URLLC requirement for one transmission of a packet is a BLER (block error rate) 1E-5 for a packet size of 32 bytes with a user plane of 1 ms.

From RAN1 perspective, reliability can be improved in a number of possible ways. The current scope for improving the reliability defining of separate CQI tables for URLLC, more compact DCI formats, repetition of PDCCH, etc. However, the scope may widen for achieving ultra-reliability as the NR becomes more stable and developed (for NR URLCC key requirements. Accordingly, NR URLLC in Rel. 15 should be capable of transmitting 32 bytes of data packet within a user-plane latency of 1 ms at the success probability corresponding to a BLER of 1E-5. Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5.

The use case of mMTC is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases and especially necessary for URLLC and mMTC is high reliability or ultra-reliability. Several mechanisms can be considered to improve the reliability from radio perspective and network perspective. In general, there are few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLCC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
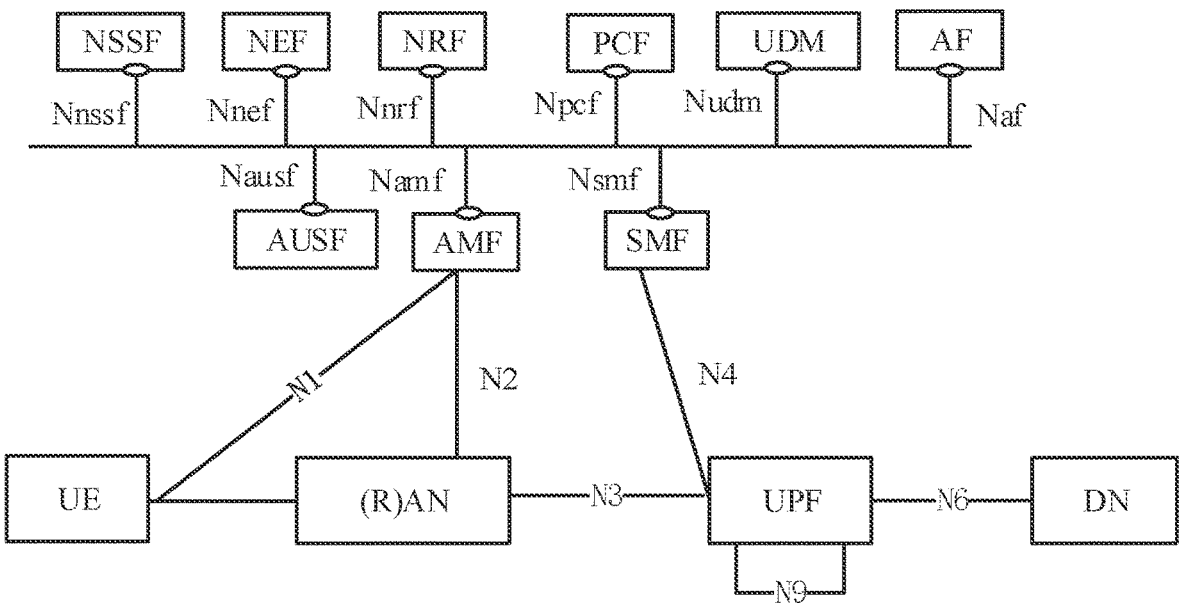
FIG. 6 is a block diagram which shows an exemplary 5G system architecture.

FIG. 6 illustrates an 5G NR non-roaming reference architecture. An Application Function (AF) interacts with the 3GPP Core Network in order to provide services, for example to support application influence on traffic routing, accessing Network Exposure Function (NEF) or interacting with the Policy framework for policy control (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

A terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node, which provides wireless access to terminals. Communication between the terminal and the base station is typically standardized. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions.

Services for transfer of data provided by a layer to the higher layers are usually referred to as channels. For example, the LTE and the NR distinguish logical channels provided for higher layers by the MAC layer, transport channels provided by the physical layer to the MAC layer and physical channels which define mapping on the physical resources.

Logical channels are different kinds of data transfer services as offered by MAC. Each logical channel type is defined by what type of information is transferred. Logical channels are classified into two groups: Control Channels and Traffic Channels. Control channels are used for the transfer of control plane information only. Traffic channels are used for the transfer of user plane information only.

Logical Channels are then mapped by the MAC layer onto transport channels. For example, logical traffic channels and some logical control channels may be mapped onto the transport channel referred to as downlink shared channel DL-SCH in downlink and onto the transport channel referred to as uplink shared channel UL-SCH in uplink.

Scheduling

In 3GPP, scheduling in NR-based operation is described (see, e.g., 3GPP TR 38.321, NR; Medium Access Control (MAC) protocol specification, version 15.4.0). Scheduling is a central part of a communication system such as NR and/or LTE.

For each time instance, a scheduler determines to which UE the shared time-frequency resources should be assigned. Uplink, downlink and/or sidelink transmissions may be scheduled.

In particular, an uplink scheduler may be responsible for dynamically controlling which terminals are to transmit on their uplink shared channel (UL-SCH). Each scheduled terminal is provided with a scheduling grant including a set of resources upon which the terminal should transmit its UL-SCH.

In other words, the function of the uplink scheduling is to dynamically determine which devices are to transmit and on which uplink resources. The dynamical scheduling is typically performed by means of a Physical Downlink Control Channel (PDCCH). The physical downlink control channel carries scheduling grants and other control information which can also be referred to as Downlink Control Information, DCI. Each terminal (UE) monitors a PDCCH. This means that the UE (blindly) decodes certain resources referred to as a search space. PDCCH Search Space is an area in the downlink resource grid where PDCCH may be carried. The UE performs blind decoding in these search space trying to find PDCCH data (the DCI). In order to decode the PDCCH, the UE applies its own RNTI (Radio Network Temporary Identity) and tries to decode the PDCCH in the resources called control channel elements, CCEs. If the decoding is successful (which can be checked by an error detection code such as cyclic redundancy check), the DCI is received. The UE may also blindly try various parameter values for some selected transmission parameters. Each terminal may monitor more than one PDCCHs. The PDCCH may be common to a group of UEs (in which case, the UEs are using a common group RNTI) or dedicated to a particular UE.

The standard (LTE or NR) defines several different formats of DCI. These formats differ from each other according to their purpose. For example, formats for carrying uplink grant (such as formats 0 or 4) differ from formats which carry downlink grants or no grants at all. Moreover, there are different formats defined in accordance with the utilization of beamforming, broadcast/multicast or the like.

Correspondingly, in the uplink, the control information on physical layer is carried by a Physical Uplink Control Channel. PUCCH carries a set of parameters called UCI (Uplink Control Information). This is similar to PDCCH which carries the above mentioned DCI. Depending on the kind of information the UCI in PUCCH carries, PUCCH is also available in different formats. For example:

format 1 carries scheduling request, SR,
format 4 carries SR together with channel state information (CSI),
format 3 carries SR with HARQ acknowledgements (positive or negative) and CSI, There are further formats defined by the LTE and/or NR.

The basis for uplink scheduling are scheduling grants, containing providing the device information about the resources and an associated transport format to use for transmission of the UL-SCH. In other words, a DCI with a certain format (defined, for example, in standard) may carry resource allocation (RA) corresponding to the resource grant, as well as some further transmission parameters such as modulation and coding scheme (MCS), configuration for multiple input multiple output (MIMO) transmission or the like.

If a terminal has a valid grant, it is allowed to transmit its corresponding UL-SCH mapped onto the physical uplink shared channel (PUSCH) specified by the resource allocation.

That is, the scheduler needs knowledge about terminals having data to transmit and, therefore, needs to be scheduled uplink resources. There is no need to provide uplink resources to a device with no data to transmit, as this would result on the device performing padding to fill up the granted resources. Hence, the scheduler needs to know whether the device has data to transmit and should be given a grant.

Scheduling Requests

Scheduling requests may be used for terminals not having a valid scheduling grant. A scheduling request may be transmitted on a physical uplink control channel, PUCCH. Each terminal may be assigned a dedicated scheduling request resource, occurring every n-th subframe. A scheduling request may be a simple flag, raised (set) by the terminal to request uplink resources from the uplink scheduler. With a dedicated scheduling request mechanism, the identity of the requesting terminal does not have to be provided together with the scheduling request, as the identity of the terminal is implicitly known from the resources upon which the request is transmitted. These are configured by the scheduling node, such as the gNB, e.g., by a higher layer control protocol.

Upon reception of the scheduling request, the scheduling device can assign a scheduling grant to the terminal. If the terminal receives a scheduling grant, it transmits its data in the scheduled resources. The data to be transmitted on the PUSCH may include, at first buffer status which notified the scheduling node of the amount of data the UE has to transmit. Based on the buffer status, the scheduling node may then schedule the actual data resources on the PUSCH. However, this is only an option and, in general, data resources may also be scheduled directly. In some system it is also possible to associate a scheduling request with a particular amount of data requested to be scheduled.

If the terminal does not receive a scheduling grant until the next possible instant, the scheduling request may be repeated.

Therefore, a contention-free scheduling-request mechanism on the PUCCH is provided, wherein each terminal in the cell is given a reserved resource on which it can transmit a request for uplink resources.

A UE MAC entity may be configured with zero, one, or more SR configurations. An SR configuration consists of a set of PUCCH resources for scheduling requests across different bandwidth parts (BWP). For a logical channel (LCH), at most one PUCCH resource for SR is configured per BWP. Each SR configuration corresponds to one or more logical channels. Mapping between logical channels and SR configurations may be configured by Radio Resource Control (RRC) messaging.

An SR procedure may be started when a regular buffer status reporting (BSR) is triggered but uplink radio resources to transmit the BSR are not available in the UE, as mentioned above. During the SR procedure, the UE may perform either transmission of the SR over the PUCCH or initiate a random access (RA) procedure, depending on whether the UE is configured with the PUCCH resource for SR or not. The RA procedure is initiated only when the PUCCH resource for SR is not configured.

When the UE MAC entity has an SR transmission location on the valid PUCCH resource for SR configured, the physical layer (PHY) is instructed to signal the SR on one valid PUCCH resource for SR. Subsequently, an SR prohibit timer this started (sr_prohibitTimer). At the time of a successive SR transmission occasions, the MAC does not instruct the PHY to signal the SR if the SR prohibit timer is running.

In NR, SR resources are configured with certain periodicity. Once the SR is transmitted by the UE, the SR prohibit timer is initiated and no SR is sent on the already configured resources as long as the SR prohibit timer is running.

The scheduling request configuration information element used for configuration of scheduling requests is defined in 3GPP TS 38.331, ("NR; Radio Resource Control (RRC); Protocol specification," version 15.4.0, section 6.3.2) is shown in the following.

```
SchedulingRequestToAddMod ::=    SEQUENCE {
    schedulingRequestId          SchedulingRequestId,
    sr-ProhibitTimer             ENUMERATED {ms1, ms2, ms4, ms8, ms16, ms32, ms64, ms128}
    sr-TransMax                  ENUMERATED { n4, n8, n16, n32, n64, spare3, spare2, spare1}
}
```

SchedulingRequestConfig Information Element

In particular, the scheduling request prohibit timer is configured by sr-ProhibitTimer and indicates a time duration during which a scheduling request is not to be transmitted after transmission of a SR, even if no scheduling grant has been received. A maximum number of scheduling requests is defined by sr-TransMax. Sr-ProhibitTimer and sr-TransMax are provided from the scheduling node to the UE, e.g., via RRC signaling.

When the prohibit timer (sr-ProhibitTimer) is active, no further SR is initiated. The sr-ProhibitTimer is per SR configuration and may be set to a value in the range from 1 ms to 128 ms.

For example, if gNB configured the sr-ProhibitTimer as 32 ms, gNB may allocate uplink resources within 32 ms after receiving the SR and UE needs to monitor PDCCH for a maximum of 32 ms after sending the SR.

Discontinuous Reception—DRX

Packet-data is often highly bursty, with occasional periods of silence. From a delay perspective, it is beneficial to monitor the downlink control signaling permanently to receive uplink grants or downlink data transmissions and instantaneously react on changes in the traffic behavior. At the same time this comes at a cost in terms of power consumption at the device. To reduce the device power consumption, LTE includes mechanisms for discontinuous reception (DRX).

The basic mechanism for DRX is a configurable DRX cycle in the device. With a DRX cycle configured, the device monitors the downlink control signaling only in an active period per DRX cycle, sleeping with the receiver circuitry switched off in the remaining inactive period. This allows for a significant reduction in power consumption. Naturally, this implies restrictions to the scheduler as the device can be addressed only in the active periods.

DRX cycles may be configured in the LTE downlink so that the UE, by periodically switching off of a receiver, does not have to decode the physical downlink control channel (PDCCH) or receive physical downlink shared channel (PDSCH) transmission in certain periods, as defined, for instance, in 3GPP TS 36.321 ("Evolved Universal Terrestrial Radio Access (E-UTRA); Medium Access Control (MAC) protocol specification," version 15.5.0, section 5.7) for connected mode, and 3GPP TS 36.304 ("Evolved Universal Terrestrial Radio Access (E-UTRA); User Equipment (UE) procedures in idle mode," version 15.3.0, section 7.1) for idle mode.

According to the 3GPP TS 38.321 v15.5.0 specification, when a DRX cycle is configured, the active time includes times where a drx-onDurationTimer, a drx-InactivityTimer, a drx-RetransmissionTimerDL, a drx-RetransmissionTimerUL or a ra-ContentionResolutionTimer is running, as described in section 5.1.5 of 3GPP TS 38.321.

The drx-onDurationTimer defines the duration at the beginning of a DRX cycle, whereas the drx-InactivityTimer specifies the duration after the PDCCH occasion in which a PDCCH indicates a new uplink (UL) or downlink (DL) transmission for the MAC entity. The drx-RetransmissionTimerDL and -UL define the maximum duration until a DL retransmission is received and the maximum duration until a grant for UL retransmission is received, respectively.

Further, the active time includes times where a PDCCH indicating a new transmission addressed to the cell radio network temporary identifier (C-RNTI) of the MAC entity has not been received after successful reception of a Random Access Response for the Random Access Preamble not selected by the MAC entity among the contention-based Random Access Preamble, as described in section 5.1.4 of 3GPP TS 38.321 v15.5.0.

As described above, a scheduling request procedure is used by UE to request radio resource for a new uplink transmission. In particular, during a time where a scheduling request has been sent and is pending, as described in section 5.4.4 of 3GPP TS 38.321 v15.5.0, the PDCCH is monitored for scheduling allocation.

Figure 7:
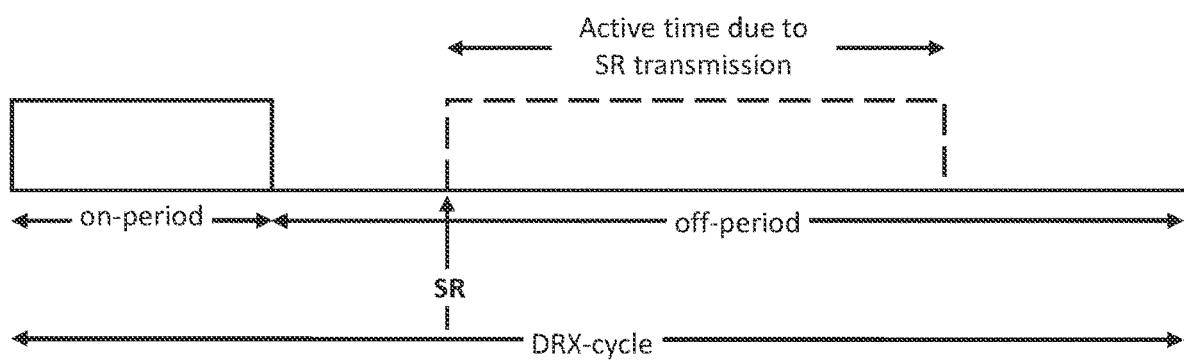
FIG. 7 illustrates transmission of a scheduling request and active periods when a discontinuous reception, DRX, cycle is configured, according to 3GPP TR 38.321.

That is, the PDCCH is monitored when a SR is sent on PUCCH and is pending. FIG. 7 schematically illustrates the active and inactive times (on-periods and off-periods) according to a configured DRX cycle (solid line) as well as the active time due to a pending scheduling request (dashed line). In FIG. 7, the time is illustrated on the horizontal axis. As soon as the SR is transmitted on PUCCH, as indicated with the arrow labelled "SR" in FIG. 7, UE starts monitoring PDCCH for an uplink grant for the scheduling data to be transmitted.

Figure 8A:
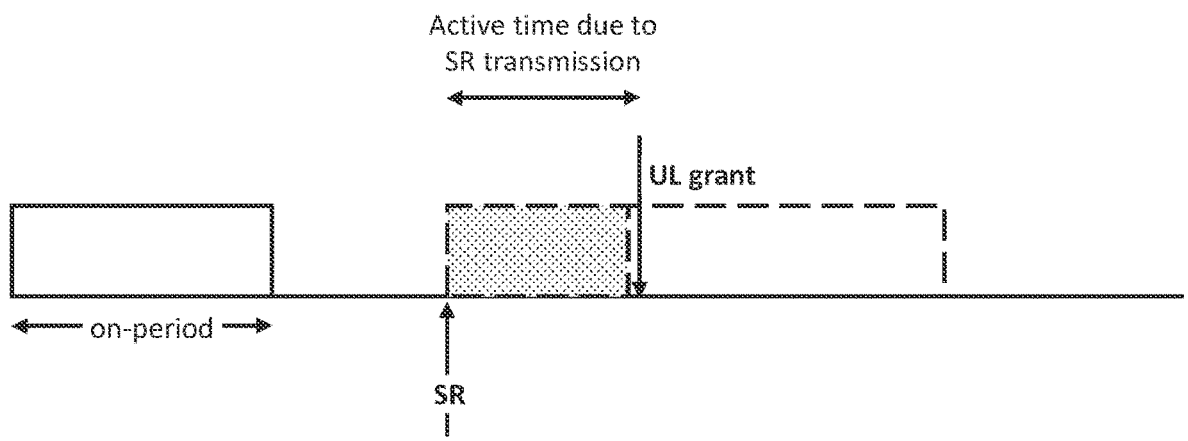
FIG. 8A schematically illustrates a temporal sequence of transmission of a scheduling request and reception of an uplink grant together with active periods in DRX configuration for an associated high priority logical channel.
Figure 8B:
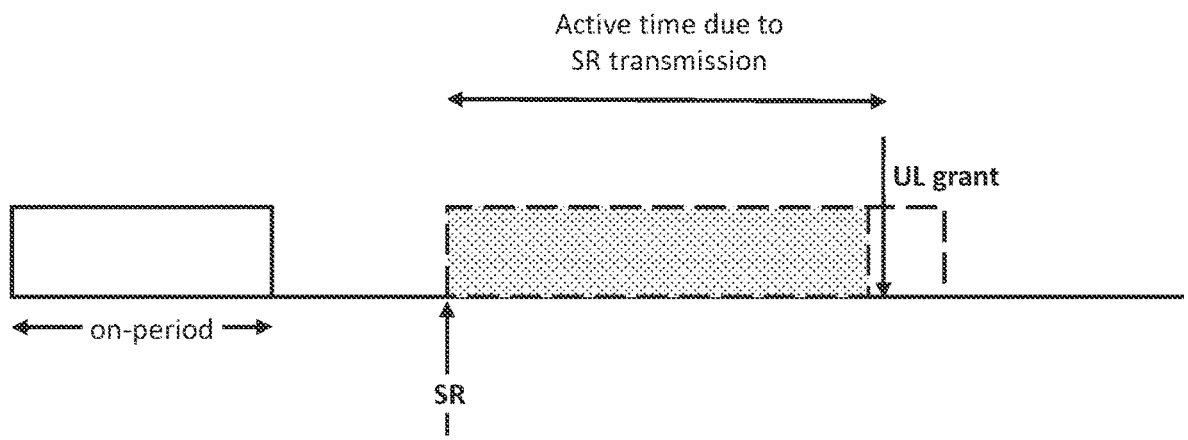
FIG. 8B schematically illustrates a temporal sequence of transmission of a scheduling request and reception of an uplink grant together with active periods in DRX configuration for an associated low priority logical channel.

However, UE may not be scheduled immediately after sending the scheduling request. FIGS. 8A and 8B schematically illustrate active and inactive times according to a configured DRX cycle as well as the active time due to a pending scheduling request. In the figures, the point in time where an uplink grant (UL grant) is received is indicated by an arrow labelled "UL grant." As long as the SR is pending, PDCCH is monitored for the UL grant.

In the situation illustrated in FIG. 8B, the UL grant is received at a point in time longer after the SR transmission than in the situation illustrated in FIG. 8A. This may be the case where a scheduling device prioritizes the scheduling of UL grant based on a priority of the associated logical channel and the traffic load.

As a result, the UE consumes power in monitoring PDCCH during the period when gNB does not intend to schedule an UL grant to the UE. This period is illustrated as a hatched area in FIGS. 8A and 8B. During the period where no UL grant is transmitted, the UE monitors PDCCH and, thus, consumes power.

The present disclosure provides techniques which may facilitate for the monitoring duration being adjusted in the framework of a SR procedure. In particular, the present disclosure provides a SR procedure in a configured DRX cycle for reducing the power consumption of the UE.

Figure 9:
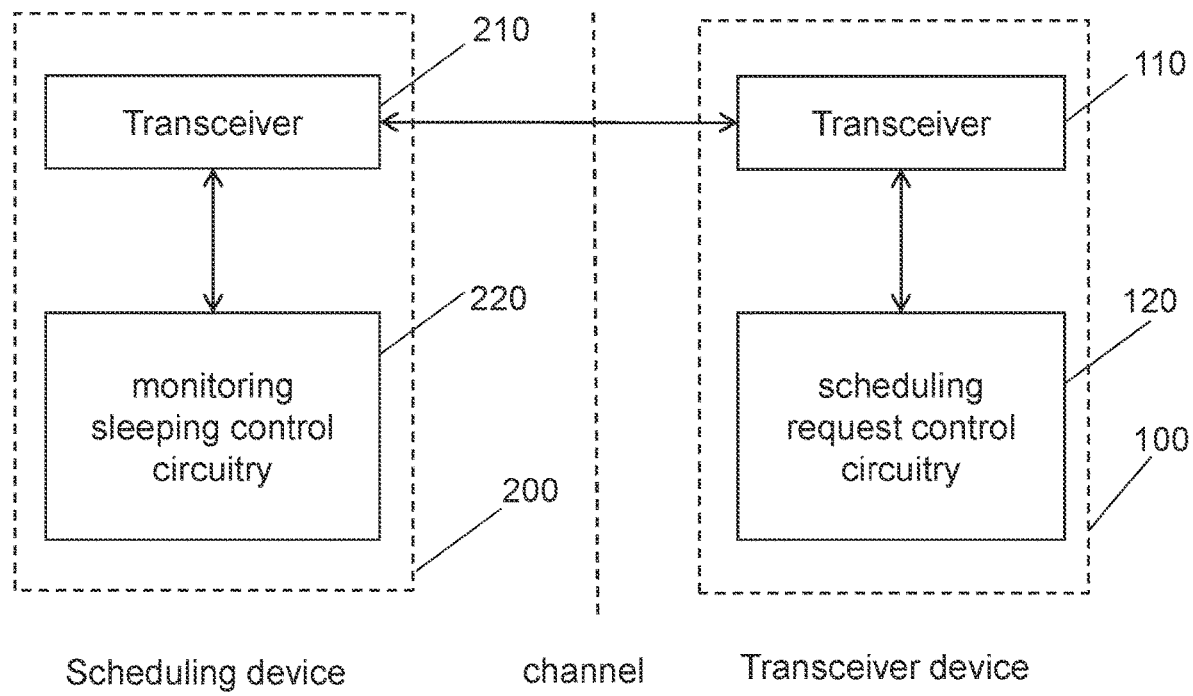
FIG. 9 is a block diagram showing the functional components of a transceiver device and a scheduling device according to an embodiment.

The disclosure provides a transceiver device and a scheduling device as shown in FIG. 9.

The transceiver device 100 comprises a transceiver 110 (a transmitter and/or receiver comprising hardware component (s) such as one or more antennas and control circuitry which controls operation of the hardware component(s)), which, in operation, transmits a scheduling request for scheduling data over a physical uplink control channel, PUCCH. Further, the transceiver device 100 comprises circuitry 120 (or processing circuitry), which, in operation, initiates a monitoring sleeping timer after the transceiver 110 transmitted the scheduling request. Further, the transceiver 110, in operation, does not monitor a physical downlink control channel, PDCCH, while the monitoring sleeping timer is running, and starts monitoring the PDCCH for resource allocation for the scheduling data when the monitoring sleeping timer has expired.

For instance, the transceiver device 100 is a UE in a NR network. Accordingly, the transceiver 110 and circuitry 120 are also referred to as "UE transceiver" and "UE circuitry." However, these terms are merely used to distinguish the transceiver 110 and the circuitry 120 from circuitry and transceiver(s) comprised by other devices such as a scheduling device or a base station. The transceiver device 100 may be a terminal service, relay device, or communication device of a similar communication system. The UE circuitry may be considered as or including "monitoring sleeping control circuitry."

Further provided is a scheduling device 200 (or scheduling node) as shown in FIG. 9.

The scheduling device 200 comprises circuitry 220, which, in operation, allocates resources according to a scheduling request for scheduling data, and initiates a transmission timer; The scheduling device 200 further comprises a transceiver 210, which, in operation, receives the scheduling request over a physical uplink control channel, PUCCH, and transmits a resource allocation indicator indicating the allocated resources over a physical downlink control channel, PDCCH, after the transmission timer has expired.

For instance, the scheduling device 200 is a network node (base station) in a NR network system (a gNB) or in a similar communication system. The circuitry 220 is also referred to as "scheduling request control circuitry" or "scheduling device circuitry," to distinguish it from circuitry such as the UE circuitry 120.

Further provided is a method, comprising transmitting a scheduling request for scheduling data over a physical uplink control channel, PUCCH, and initiating a monitoring sleeping timer after transmission of the scheduling request. Further, the method comprises prevent monitoring of a physical downlink control channel, PDCCH, while the monitoring sleeping timer is running, and start monitoring the PDCCH for resource allocation for the scheduling data when the monitoring sleeping timer has expired.

Further provided is a method, comprising receiving a scheduling request for scheduling data over a physical uplink control channel, PUCCH, and initiating a transmission timer. The method further comprises allocating resources according to the scheduling request and transmitting a resource allocation indicator indicating the allocated resources over a physical downlink control channel, PDCCH, after the transmission timer has expired.

In the further description, the details and embodiments apply to each of the transceiver device 100, the scheduling device 200 (or scheduling nodes) and the methods unless explicit statement or context indicates otherwise.

The transceiver device 100 transmits, using the transceiver 110, a scheduling request for transmission of scheduling data over the PUCCH and starts, using the UE circuitry 120, a monitoring sleeping timer after the SR has been transmitted. While the monitoring sleeping timer is running, the transceiver 110 does not monitor the PDCCH for receiving an UL grant corresponding to the transmitted SR. After expiration of the monitoring sleeping timer, the transceiver 110 starts monitoring the PDCCH for reception of the UL grant according to the transmitted SR, wherein the UL grant indicates allocated resources for transmission of the scheduling data.

Figure 10:
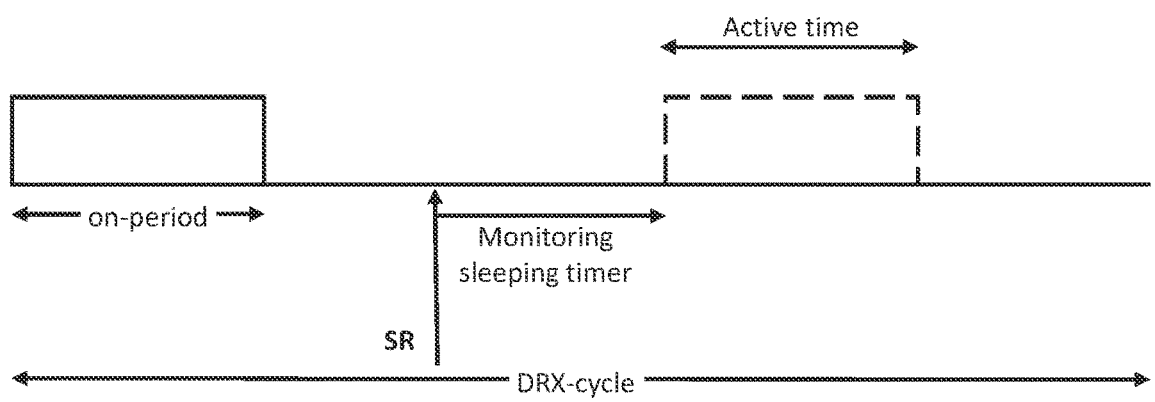
FIG. 10 illustrates a delay of the active period from the transmission time of a scheduling request according to an embodiment.

The temporal sequence is schematically illustrated in FIG. 10, wherein, when a DRX cycle is configured, the UE (or specifically, the transceiver), monitors a PDCCH during an active period and does not monitor the PDCCH during inactive periods.

According to one embodiments, once the SR is transmitted, the monitoring sleeping timer is initiated, and when the monitoring sleeping timer has expired, the transceiver 110 starts monitoring the PDCCH for the UL grant from a scheduling device 200. That is according to this embodiment, the monitoring sleeping timer is initiated when the scheduling request is transmitted by the transceiver 110.

With this procedure, the UE's power consumption is reduced, as the UE's active time monitoring PDCCH is reduced due to the running monitoring sleeping timer in a period where the SR is pending but the scheduling device does not intend to transmit the UL grant.

Figure 11:
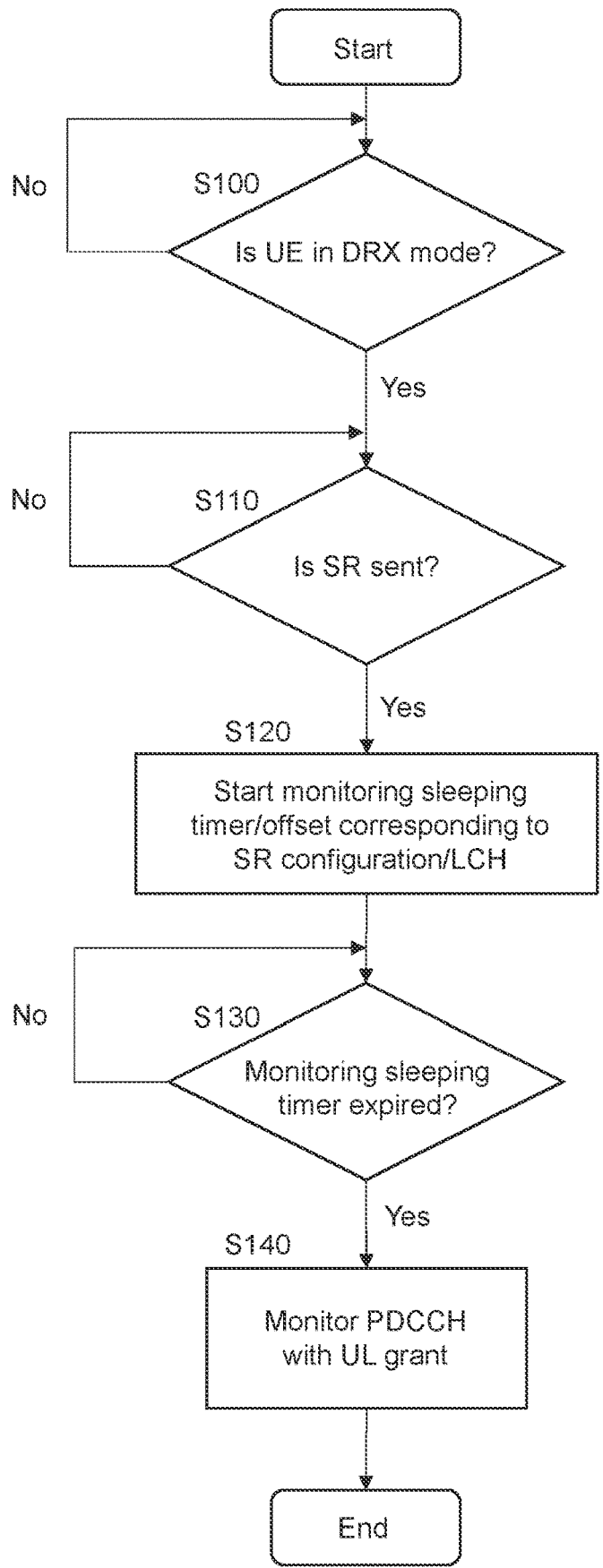
FIG. 11 is a flowchart illustrating transmission of a scheduling request and starting monitoring of a physical downlink control channel after a monitoring sleeping timer has expired.

FIG. 11 is a flowchart illustrating transmission of a scheduling request and starting monitoring of a physical downlink control channel after a monitoring sleeping timer has expired according to an embodiment.

After start of the procedure, in step S100, it is determined whether or not a DRX mode is configured, that is, whether or not the UE is in a DRX mode. In a case where it is determined that the UE is not in DRX mode (No in step S100), the procedure repeats at the beginning. In a case where it is determined that the UE is in a DRX mode (Yes in step S100), the procedure is continues to step S110.

In step S110, it is determined whether a SR has been sent. For example, it is determined whether a transceiver 110 has transmitted a scheduling request for scheduling data to be transmitted, over a PUCCH to a scheduling device 200, as illustrated in FIG. 9. In a case where no scheduling request has been transmitted (No in step S110), the procedure repeats step S110. In a case where it is determined that a SR has been transmitted (Yes in step S110), the procedure continues to step S120.

In step S120, a monitoring sleeping timer is initiated. For example, the circuitry 120 of the transceiver device 100, as illustrated in FIG. 9, initiates the monitoring sleeping timer. For example, the runtime of the monitoring sleeping timer may be defined by a time duration or an offset in terms of a certain symbols or slots of the PDCCH. This is described below. Further, the runtime of the monitoring sleeping timer may be configured according to a scheduling request configuration, as described below. While the monitoring sleeping time is running, i.e., has not expired, the PDCCH is not monitored for an UL grant for the scheduling data.

In step S130, it is determined whether the monitoring sleeping timer has expired. In a case where the monitoring sleeping timer has not expired (No in step S130), the procedure remains at step S130 and repeatedly determines whether the monitoring sleeping timer has expired. In a case where the monitoring sleeping timer has expired (Yes in step S130), the procedure continues to step S140.

In step S140, monitoring of the PDCCH is started for receiving resource allocation (UL grant) for the scheduling data corresponding to the scheduling request transmitted in step S110.

As indicated above, the runtime of the monitoring sleeping timer may be configured individually according to a priority of service, i.e., the value of the monitoring sleeping timer can be configured individually in each SR configuration. That is, a runtime of the monitoring sleeping timer is configured according to a level of priority of a scheduling request configuration.

For instance, a runtime of the monitoring sleeping timer may be set to a smaller value for a SR configuration of a first level of priority than for a SR configuration of a second level of priority, which is lower than the first level of priority.

In other words, SR with higher priority and smaller latency could be configured with relatively smaller runtime of the monitoring sleeping timer, and SR with lower priority and larger latency could be configured with relatively larger runtime of the monitoring sleeping timer. In this case, the power saving would be less for a higher priority and lower latency service than for a lower priority and larger latency service.

As described above, after the SR is sent by the transceiver 110, the UE circuitry 120 applies a runtime of the monitoring sleeping timer corresponding to an SR configuration.

Figure 12:
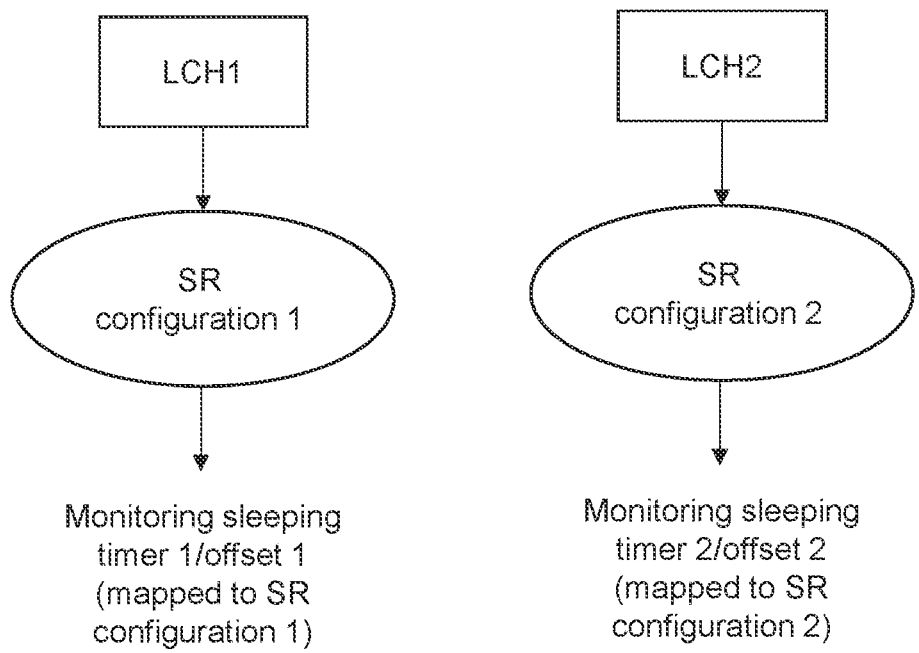
FIG. 12 schematically illustrates mapping of a single scheduling request configuration per logical channel, wherein a first runtime of a monitoring sleeping timer is configured for a first logical channel and a second runtime of a monitoring sleeping timer is configured for a second logical channel.

As shown in FIG. 12, a first runtime of the monitoring sleeping timer may be configured for a first logical channel and a second runtime of the monitoring sleeping timer may be configured for a second logical channel. Therefore, the runtime of the monitoring sleeping timer may be different depending on the logical channel. In particular, a larger runtime of the monitoring sleeping timer may be configured for a low priority logical channel than for a high priority logical channel, and vice versa. As shown in FIG. 12, LCH1 and LCH2 are mapped to different SR configurations since LCH1 and LCH2 have different levels of priority.

Although in FIG. 12, a mapping of the runtime of the monitoring sleeping timer is illustrated for two logical channels, the present embodiment is not limited to this, and different runtimes of the monitoring sleeping timer may be configured for multiple logical channels/SR configurations.

Figure 13:
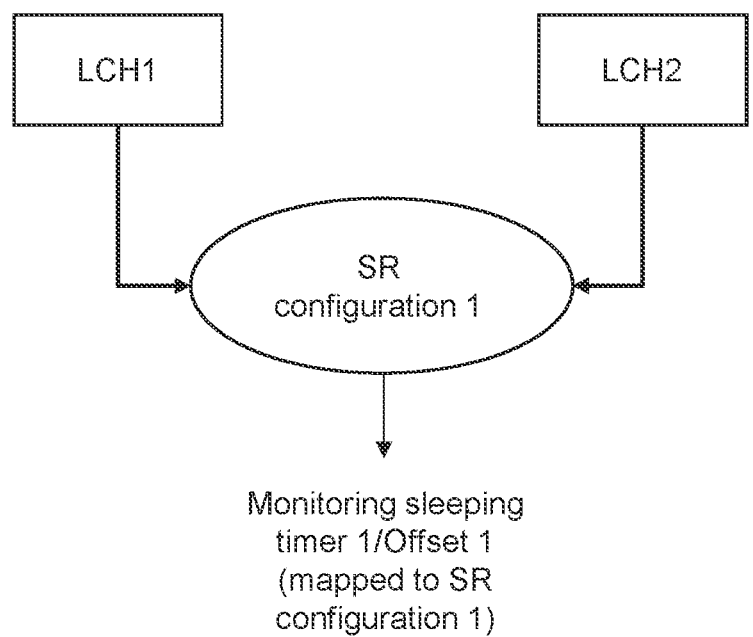
FIG. 13 schematically illustrates mapping of one scheduling request configuration per two logical channels.

For instance, as shown in FIG. 13, two logical channels of the same level of priority (LCH1 and LCH2) are mapped to a single SR configuration and a single runtime of the monitoring sleeping timer is mapped to the SR configuration.

Although in FIGS. 12 and 13, either a one-to-one mapping of runtimes, SR configurations and logical channels or a mapping of multiple logical channels to a single SR configuration is illustrated, the present embodiment is not limited to this, and a combination of mapping of a single SR configuration to multiple logical channels and mapping of a single SR configuration to a single logical channel may be applied.

According to an embodiment, the runtime of the monitoring sleeping timer is fixed, wherein the network/the scheduling device 200 and the transceiver device 100 map each SR configuration with a pre-defined runtime of the monitoring sleeping timer. In particular, the mapping may be depending on the logical channel (SR) priority such that it is defined which logical channel corresponds to which runtime of the monitoring sleeping timer. With this approach, no additional signaling is needed.

For example, table 1 illustrates fixed values in the specification. As illustrated in table 1, the runtime of the monitoring sleeping timer is indicated for scheduling request identifiers 0 to 7 in terms of a symbol (sym) or slot (sl) offset. For instance, for the scheduling request identifier 5, the transceiver 110 does not monitor PDCCH for the UL grant for 8 slots. Alternatively, the runtime of the monitoring sleeping timer may be configured in terms of a time duration, for instance, a time duration from 0 to 256 ms.

TABLE 1

Fixed Value of Monitoring Sleeping Timer Runtime/Offset.

| schedulingRequestID | Timer/offset |
|---|---|
| 0 | sym2 |
| 1 | sym6 |
| 2 | sl1 |
| 3 | sl2 |
| 4 | sl4 |
| 5 | sl8 |
| 6 | sl10 |
| 7 | sl16 |

For example, when a logical channel LCH1 is mapped to SR configuration 1 and a scheduling request is triggered due to LCH1, MAC passes schedulingRequestID information to PHY to transmit the scheduling request. If the SR configuration of LCH1 is associated with schedulingRequestID 5, the UE applies a monitoring sleeping timer runtime of 8 ms.

The scheduling request configuration may be received by the transceiver device 100 by a scheduling request configuration indicator indicating at least one scheduling request configuration with at least on associated level of priority.

For example, the transceiver 110 may receive the scheduling request configuration indicator via a radio resource control, RRC, message.

According to an embodiment, the network signals a runtime of the monitoring sleeping timer for each SR configuration, such that the monitoring sleeping timer runtime may be dynamically configured. For instance, the monitoring sleeping timer runtime may be signaled via an RRC message, either a system information message or a dedicated RRC message. With this approach, the network may take a current traffic load into consideration and change the runtimes via RRC message.

For example, a scheduling request configuration information element for RRC signaling that may be used for configuration of scheduling requests is shown in the following.

SchedulingRequestResourceConfig Information Element

| SchedulingRequestResourceConfig ::= | SEQUENCE { |
|---|---|
| schedulingRequestResourceId | SchedulingRequestResourceId, |
| schedulingRequestId | SchedulingRequestId, |
| timer/offset | CHOICE {sym2, sym6, sl1, sl2, sl4, sl5, sl8, sl10, sl16, sl20, sl126, sl130, sl136, sl40} |

In particular, the monitoring sleeping timer is configured by timer/offset and indicates a runtime of a monitoring sleeping timer in terms of symbols of slots of the PDCCH.

According to an embodiment, the network/gNB 200 may determine a runtime of a monitoring sleeping timer and transmit the determined runtime to UE 100 if it is not intended to schedule UL resources after a scheduling request for scheduling data is received.

For instance, a MAC control element indicating the runtime of a monitoring sleeping timer may be transmitted carrying the timing related information in a bit map format.

In LTE, for example, the MAC layer may insert so-called MAC control elements (MAC CE) into transport blocks to be transmitted over a transport channel. A MAC CE is used for inband control signaling, for instance, timing advance commands or random-access response.

According to the present disclosure, however, a MAC CE may carry information on the runtime of a monitoring sleeping timer, wherein the MAC CE may, for example, indicate a time duration in the range from 0 to 256. The time unit of the length could be a time duration (ms) or a number of symbols or slots.

Figure 14:
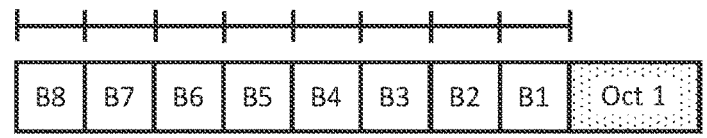
FIG. 14 schematically illustrates a MAC Control Element, CE, indicating a runtime of a monitoring sleeping timer according to an embodiment.

FIG. 14 schematically illustrates a MAC Control Element, CE, indicating a runtime of a monitoring sleeping timer according to an embodiment. For example, if UE 100 receives a MAC CE command indicating "0 0 0 0 1 0 0 0," UE does not monitor PDCCH for scheduling resources for 8 ms or 8 slots.

Figure 15:
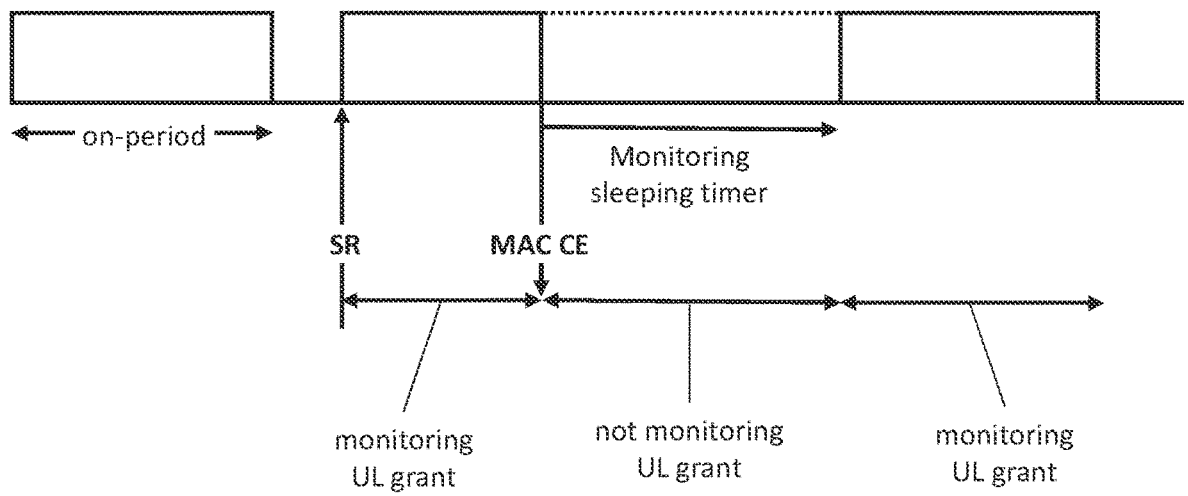
FIG. 15 schematically illustrates a temporal sequence of transmission of a scheduling request, reception of a monitoring sleeping indicator and reception of an uplink grant together with active periods according to an embodiment.

FIG. 15 schematically illustrates a temporal sequence of transmission of a scheduling request, reception of a monitoring sleeping indicator and reception of an uplink grant together with active periods according to an embodiment. In particular, the transceiver 110 transmits a scheduling request for scheduling data and monitors the PDCCH for UL grant. When a MAC CE indicating a runtime of a monitoring sleeping timer is received (illustrated as an arrow indicated with "MAC CE"), the circuitry 120 initiates the monitoring sleeping timer with an associated runtime according to the runtime indicated by the received MAC CE. As long as the monitoring sleeping timer is running, the transceiver 110 does not monitor the PDCCH for scheduling allocation for the scheduling data corresponding to the transmitted scheduling request. When the monitoring sleeping timer has expired, the transceiver 110 starts monitoring the PDCCH for the UL grant.

Figure 16:
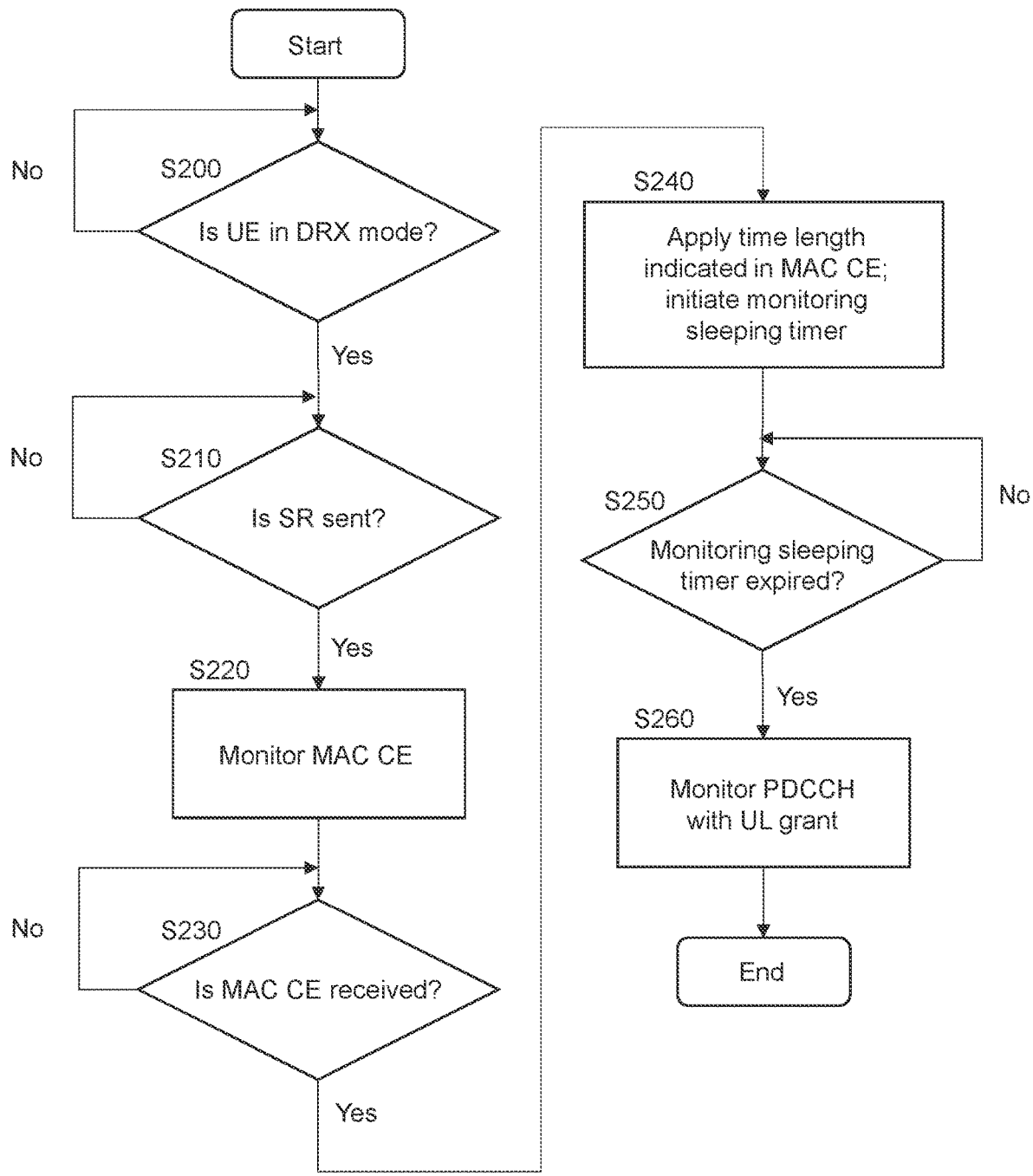
FIG. 16 is a flowchart illustrating transmission of a scheduling request, reception of a monitoring sleeping indicator and starting monitoring of a physical downlink control channel after the monitoring sleeping timer has expired.

That is, the transceiver 110 receives a monitoring sleeping indicator (the MAC CE, for instance) indicating a runtime of the monitoring sleeping timer, and the circuitry 120 initiates the monitoring sleeping timer when the monitoring sleeping indicator is received by the transceiver With this approach, the transceiver 110 of the transceiver device 100 does not monitor the PDCCH for a time period with a time duration indicated by the received MAC CE. Thus, UE power saving can be achieved in a more dynamic way by taking into account both traffic load as well as SR priority FIG. 16 is a flowchart illustrating transmission of a scheduling request, reception of a monitoring sleeping indicator and starting monitoring of a physical downlink control channel after the monitoring sleeping timer has expired.

After start of the procedure, in step S200, it is determined whether or not a DRX mode is configured, that is, whether or not the UE is in a DRX mode. In a case where it is determined that the UE is not in DRX mode (No in step S200), the procedure repeats at the beginning. In a case where it is determined that the UE is in a DRX mode (Yes in step S200), the procedure is continues to step S210.

In step S210, it is determined whether a SR has been sent. For example, it is determined whether a transceiver 110 has transmitted a scheduling request for scheduling data to be transmitted, over a PUCCH to a scheduling device 200. In a case where no scheduling request has been transmitted (No in step S210), the procedure repeats step S210. In a case where it is determined that a SR has been transmitted (Yes in step S210), the procedure continues to step S220.

In step S220 the PDCCH is started to be monitored. In step S230, it is determined whether or not a MAC CE indicating a runtime of a monitoring sleeping timer is received. In a case where a MAC CE indicating the runtime is not received (No in step S230), the procedure repeats monitoring of the PDCCH. In a case where a MAC CE indicating a runtime of the monitoring sleeping timer is received (Yes in step S240), the procedure continues to step S240.

In step S240, a monitoring sleeping timer is initiated with a runtime corresponding to the runtime indicated by the MAC CE. Further, monitoring of the PDCCH is terminated. That is while the monitoring sleeping time is running, i.e., has not expired, the PDCCH is not monitored by the transceiver 110, for instance.

In step S250, is determined whether the monitoring sleeping timer has expired. In a case where the monitoring sleeping timer has not expired (No in step S250), the procedure remains at step S250 and repeatedly determines whether the monitoring sleeping timer has expired. In a case where the monitoring sleeping timer has expired (Yes in step S250), the procedure continues to step S260.

In step S260, monitoring of the PDCCH is started for receiving resource allocation (UL grant) for the scheduling data corresponding to the transmitted scheduling request.

According to the embodiment, the runtime of the monitoring sleeping timer is signaled by a scheduling device 200 using a MAC control element. However, the present disclosure is not limited to transmission using a MAC CE and the runtime of the monitoring sleeping timer may be another means of transmission. In particular, the scheduling device 200 may transmit a monitoring sleeping indicator indicating a runtime of the monitoring sleeping timer, and the UE circuitry 120 may initiate the monitoring sleeping timer when the monitoring sleeping indicator is received.

It goes without saying that, in a case where an UL grant may be received over the PDCCH without having received a monitoring sleeping indicator. In such a case, not monitoring the PDCCH due to a pending scheduling request is no longer required.

Further, according to the above-described embodiments, the monitoring sleeping timer may be initiated when the scheduling request is transmitted or when a monitoring sleeping indicator is received, for instance, by MAC CE.

In the first example, the monitoring of the PDCCH is not started immediately after transmission of the scheduling request, but instead, the monitoring sleeping timer is initiated and the monitoring is started after expiration.

In the second example, the monitoring of the PDCCH is started when the scheduling request is transmitted and, when a monitoring sleeping indicator is received, the monitoring of the PDCCH is interrupted for a time duration corresponding to the runtime indicated by the monitoring sleeping indicator.

However, the present disclosure is not limited to either one of said embodiments. In particular, the monitoring of the PDCCH could not be performed between transmission of the SR and expiration of a monitoring sleeping timer and between reception of a monitoring sleeping indicator and expiration of a respective monitoring sleeping timer. In other words, the methods of above-mentioned examples may be combined.

Figure 17:
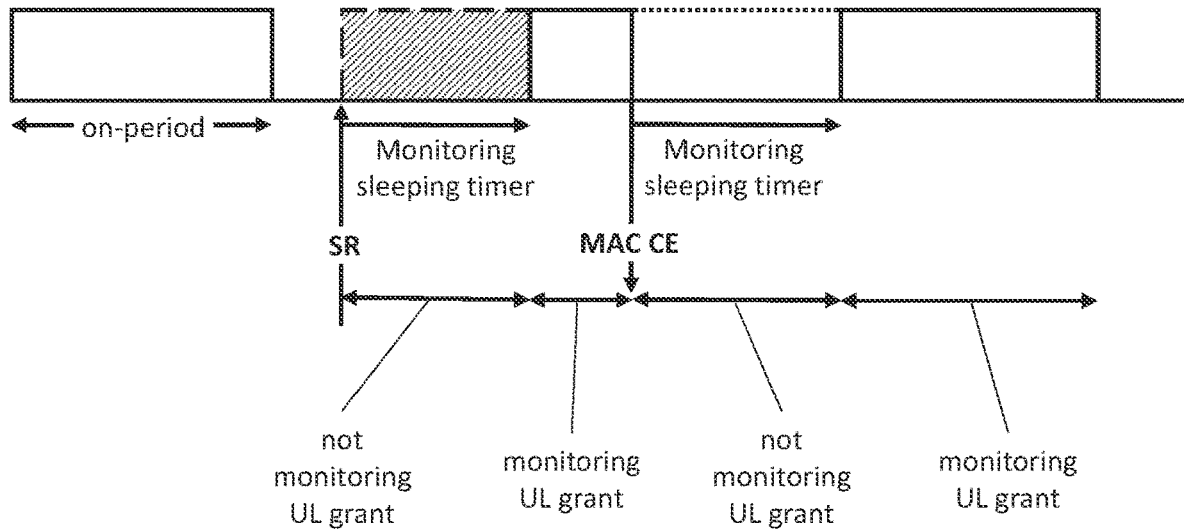
FIG. 17 schematically illustrates a temporal sequence of transmission of a scheduling request, initiation of a sleeping monitoring timer, reception of a monitoring sleeping indicator and re-initiation of a monitoring sleeping timer according to an embodiment.

This is illustrated is FIG. 17, where the hatched area indicates a time period where the PDCCH is not monitored due to a monitoring sleeping timer initiated when the SR is transmitted. Further, when the MAC CE indicating a runtime of a monitoring sleeping timer is received, the monitoring sleeping timer may be re-initiated with the received runtime or a second monitoring sleeping timer may be initiated, such that the PDCCH is not monitored in a period of a duration indicated by the MAC CE.

Please note that for this case the monitoring sleeping timer according to one or more embodiments may be re-initiated or re-started by the circuitry 120. In other words, in a case where the monitoring sleeping timer is running, it may be restarted or its remaining or total runtime until expiration may be adjusted. Alternatively or additionally, additional monitoring sleeping timers may be initiated.

The scheduling device 200 according to an embodiment may determine the runtime of the monitoring sleeping timer and transmit, using the transceiver 210 a monitoring sleeping indicator indicating the runtime of the monitoring sleeping timer. In particular, the runtime of the transmission timer may correspond to the runtime of the monitoring sleeping timer.

Further, in the above-described embodiments, it is determined whether a DRX cycle is configured for the transceiver device 100. The present disclosure, however, is not limited to determining whether a DRX cycle is configured. In particular, a configured DRX cycle is not a mandatory requirement for starting a monitoring sleeping timer and not monitoring the PDCCH as long as the monitoring sleeping timer is running.

The present disclosure further provides an SR procedure in a configured DRX cycle for reducing the power consumption of the UE.

As illustrated in FIG. 9, the transceiver device 100 comprises a transceiver 110 (a transmitter and/or receiver comprising hardware component(s) such as one or more antennas and control circuitry which controls operation of the hardware component(s)), which, in operation, transmits a buffer status report indicating an amount of scheduling data. Further, the transceiver device 100 comprises circuitry 120 (or processing circuitry), which, in operation, initiates a monitoring sleeping timer after the transceiver 110 transmitted the buffer status report. Further, the transceiver 110, in operation, does not monitor a physical downlink control channel, PDCCH, while the monitoring sleeping timer is running, and starts monitoring the PDCCH for resource allocation for the scheduling data when the monitoring sleeping timer has expired.

Further provided is a scheduling device 200 (or scheduling node) as shown in FIG. 9.

The scheduling device 200 comprises circuitry 220, which, in operation, allocates resources according to a buffer status report indicating an amount of scheduling data, and initiates a transmission timer; The scheduling device 200 further comprises a transceiver 210, which, in operation, receives the buffer status report, and transmits a resource allocation indicator indicating the allocated resources over a physical downlink control channel, PDCCH, after the transmission timer has expired.

Further provided is a method, comprising transmitting a buffer status report indicating an amount of scheduling data, and initiating a monitoring sleeping timer after transmission of the buffer status report. Further, the method comprises preventing monitoring of a physical downlink control channel, PDCCH, while the monitoring sleeping timer is running, and start monitoring the PDCCH for resource allocation for the scheduling data when the monitoring sleeping timer has expired.

Further provided is a method, comprising receiving a buffer status report indicating an amount of scheduling data, and initiating a transmission timer. The method further comprises allocating resources according to the buffer status report and transmitting a resource allocation indicator indicating the allocated resources over a physical downlink control channel, PDCCH, after the transmission timer has expired.

A buffer status report, BSR, may be a Medium Access Control (MAC)-level massage transmitted by the UE 100 to a serving gNB as a scheduling device 200 in order to provide the gNB with information about the amount of data in uplink buffers of the UE 100 (See 3GPP TS 36.321 ("Evolved Universal Terrestrial Radio Access (E-UTRA); Medium Access Control (MAC) protocol specification," version 15.5.0, section 5.4.5).

The BSR is reported in uplink to inform gNB 200 about the amount of buffered data at the UE 100 and allows for the gNB 200 to distinguish between data with different scheduling priorities, as BSR reporting is performed per logical channel group (LCG), wherein each LCG may be associated with a respective level of priority.

A LCG is a group of uplink logical channels or which a single joint buffer fill level is reported by the UE 100 in the BSR. The mapping of LCGs may be defined by the gNB 200 (See 3GPP TS 36.321 ("Evolved Universal Terrestrial Radio Access (E-UTRA); Medium Access Control (MAC) protocol specification," version 15.5.0, section 6.1.3.1, and 3GPP TS 36.331 ("Evolved Universal Terrestrial Radio Access (E-UTRA); Radio Resource Control (RRC); Protocol Specification"), version 15.5.1, section 6.3.2). A LCG may be defined as a group of logical channels with similar QoS (Quality of Service) requirements.

Figure 18A:
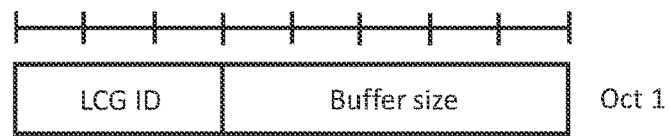
FIG. 18A illustrates a short format of a buffer status report, BSR.
Figure 18B:
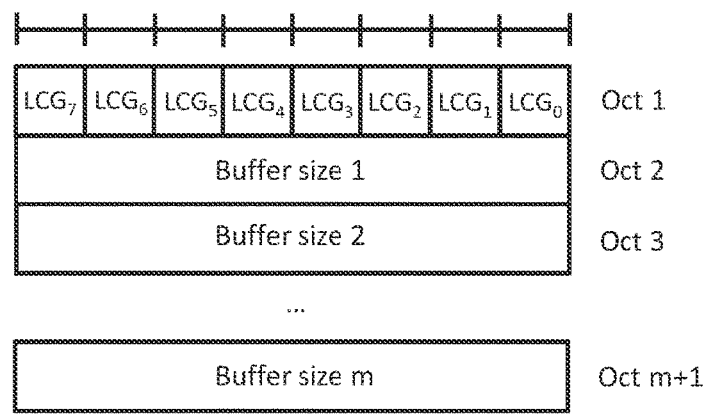
FIG. 18B illustrates a long format of a buffer status report, BSR.

Buffer status reporting may be performed per LCG by using either a long or a short BSR format, as illustrated in FIGS. 18A and 18B, respectively. FIG. 18A is an illustration of the short BSR format, wherein the group of logical channels whose buffer status is being reported is indicated by the logical channel group ID field with a length of three bits. Further, the buffer size field indicates the total amount of data. According to the long BSR format as illustrated in FIG. 18B, the BSR contains multiple buffer size fields, each of which representing one LCG. In other words, short BSR format is used to report the amount of data for one indicated logical channel group, whereas the long BSR format is used to report the amount of data for all logical channels groups. For instance, the network may configure up to eight logical channel groups per UE, depending on requirements for Quality of Service (QoS).

Figure 19:
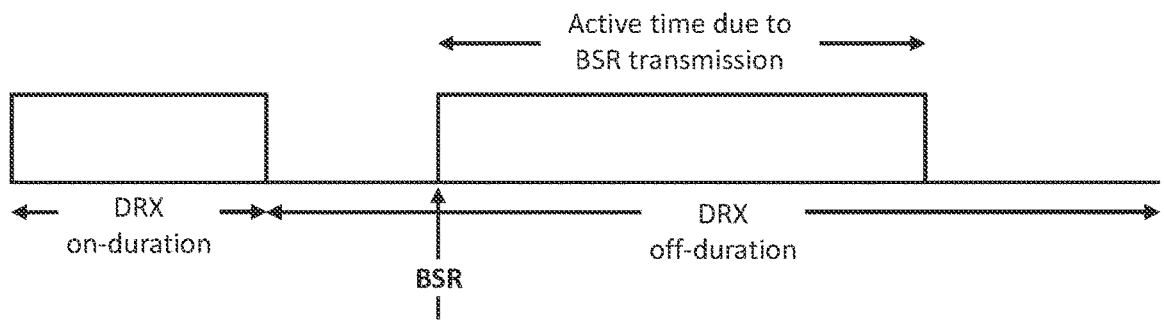
FIG. 19 illustrates transmission of a buffer status report and active periods when a discontinuous reception, DRX, cycle is configured.

When a BSR is transmitted during a DRX off period, UE may switch to DRX active time, during which PDCCH is monitored for receiving an uplink grant. This is illustrated in FIG. 19

Figure 20A:
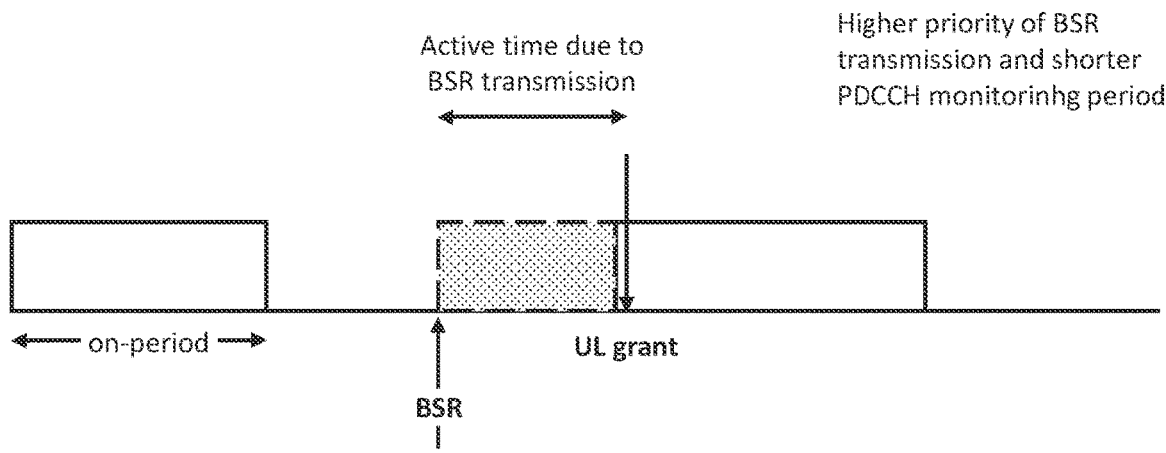
FIG. 20A schematically illustrates a temporal sequence of transmission of a buffer status report and reception of an uplink grant together with active periods in DRX configuration for an associated high priority logical channel group.
Figure 20B:
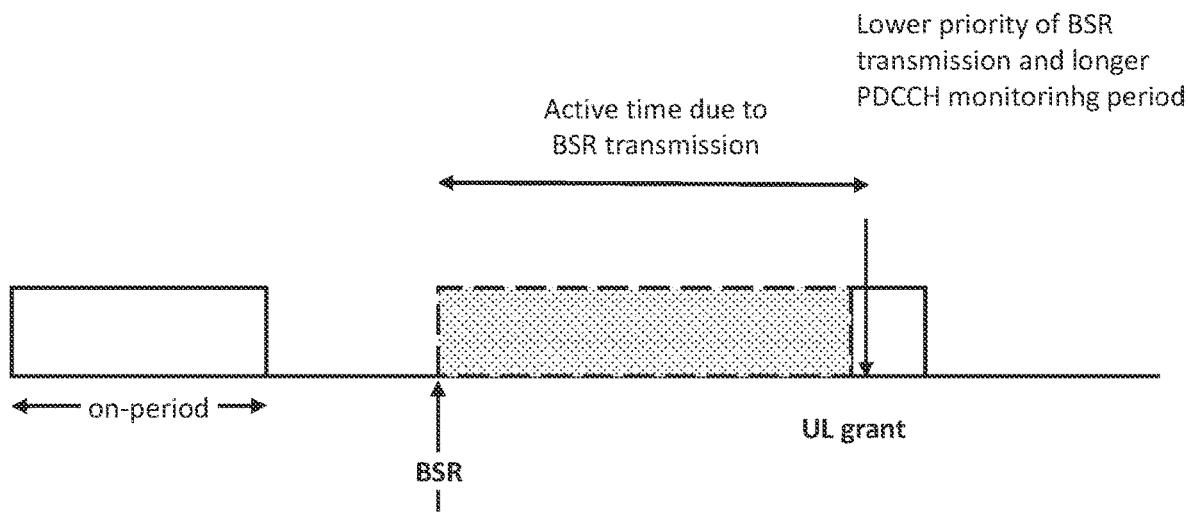
FIG. 20B schematically illustrates a temporal sequence of transmission of a buffer status report and reception of an uplink grant together with active periods in DRX configuration for an associated low priority logical channel group.

However, monitoring PDCCH by entering a DRX active time due to transmission of the BSR may result in unnecessary power consumption, as the UE 100 may not be scheduled immediately after sending the BSR. In other words, in a case where gNB 200 does not intent to schedule resources to the UE 100, for instance when scheduling of UL grants is based on a priority level of the BSR and the traffic load, UE 100 may unnecessarily monitor PUCCH for an uplink grant. For instance, as illustrated in FIGS. 20A and 20B, a higher priority of BSR transmission may result in a shorter PDCCH monitoring period than a lower priority of BSR transmission, which results in a longer PDCCH monitoring period.

Thus, the transceiver device 100 transmits, using the transceiver 110, a BSR indicating an amount of scheduling data and starts, using the UE circuitry 120, a monitoring sleeping timer after the BSR has been transmitted. While the monitoring sleeping timer is running, the transceiver 110 does not monitor the PDCCH for receiving an UL grant corresponding to the transmitted SR. After expiration of the monitoring sleeping timer, the transceiver 110 starts monitoring the PDCCH for reception of the UL grant according to the transmitted BSR, wherein the UL grant indicates allocated resources for transmission of the scheduling data.

Figure 21:
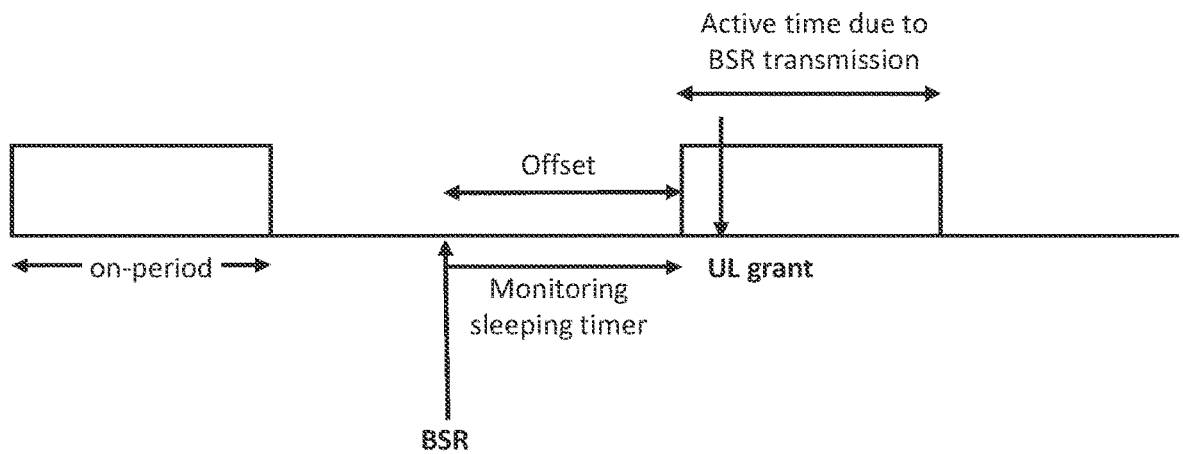
FIG. 21 illustrates a delay of the active period from the transmission time of a buffer status report according to an embodiment.

The temporal sequence is schematically illustrated in FIG. 21, wherein, the UE (or specifically, the transceiver), monitors a PDCCH during an active period and does not monitor the PDCCH during inactive periods. Specifically, after having transmitted the BSR, the monitoring sleeping timer is initiated and, when the timer expires, the UE 100 switches to active time, wherein PDCCH is monitored for an uplink grant. In other words, switching from not monitoring PDCCH to monitoring PDCCH is delayed from transmission of the BSR by a temporal offset.

Figure 22:
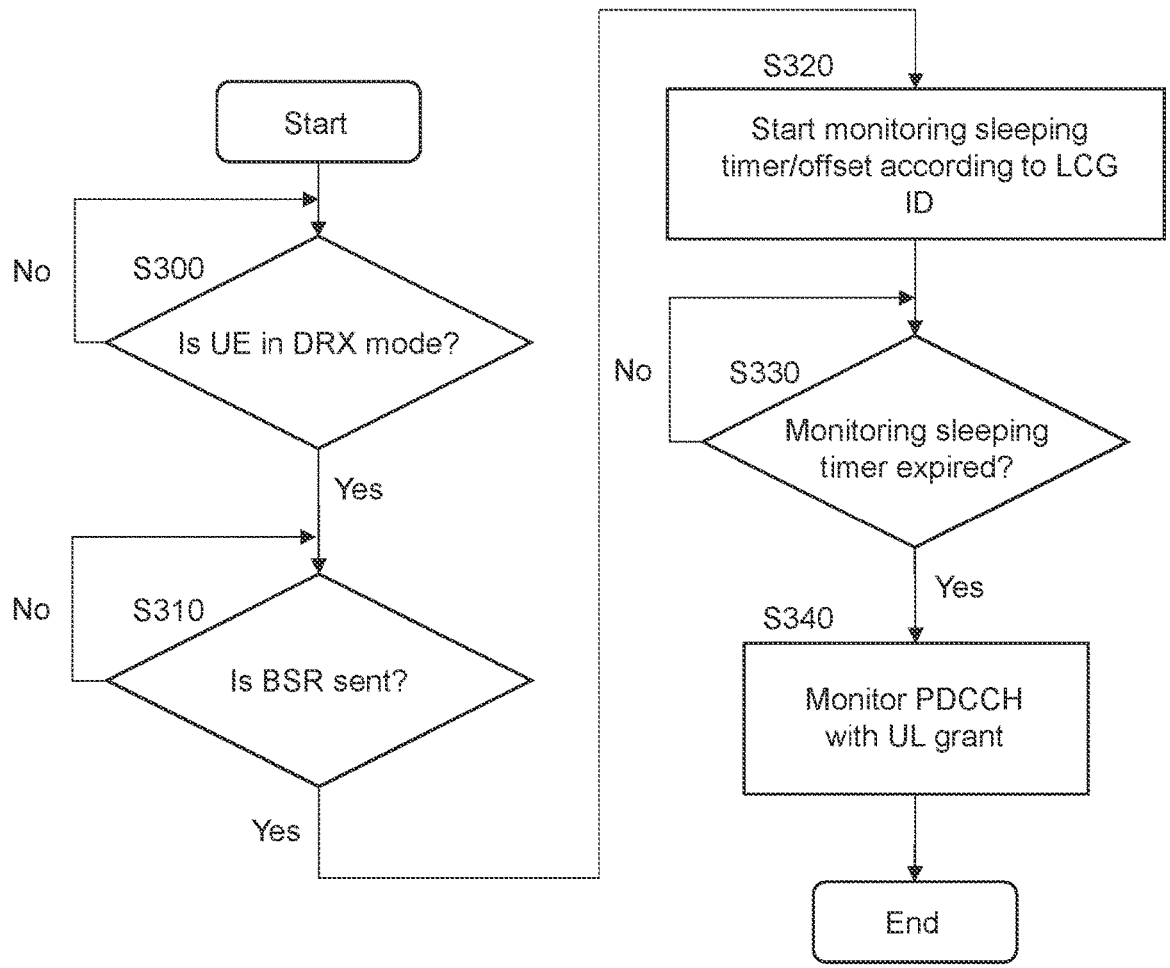
FIG. 22 is a flowchart illustrating transmission of a buffer status report and starting monitoring of a physical downlink control channel after a monitoring sleeping timer has expired.

FIG. 22 illustrates a method performed by UE 100. The steps S300, S310, S330 and S340 correspond to the method illustrated in FIG. 11, wherein instead of the scheduling request, SR, the buffer status report is transmitted. In step S320, the monitoring sleeping timer is initiated with a runtime according to the logical channel group, LCG.

For instance, a runtime may be configured for each of each LCG. For instance, a LCG having a higher priority may be associated with a shorter runtime of the monitoring sleeping timer as compared with a LCG associated with a lower level of priority.

The mapping of LCG and the runtime of the monitoring sleeping timer may be either predefined, for instance according to a definition given in a specification document, or configured dynamically, for instance, via RRC.

network may take the traffic load and the priority of traffic into consideration and change the timer runtime/offset values if required via RRC (e.g., via a system information message or a dedicated RRC message).

For example, a logical channel configuration information element for RRC signaling that may be used is shown in the following.

LogicalChannelConfig Information Element

```
-- ASN1START
-- TAG-LOGICALCHANNELCONFIG-START
LogicalChannelConfig ::=          SEQUEUCE {
    ul-SpecificParameters         SEQENCE {
        priority                  INTEGER (1..16),
        prioritisedBitRate        ENUMERATED {kBps0, kBps8, kBps16, kBps32, kBps64, kBps128,
                                   kBps256, kBps512, kBps1024, kBps2048, kBps4096, kBps8192,
                                   kBps16384, kBps32768, kBps65536, infinity},
        bucketSizeDuration        ENUMERATED {ms5, ms10, ms20, ms50, ms100, ms150, ms300,
                                   ms500, ms1000, spare7, spare6, spare5, spare4, spare3,
                                   spare2, spare1},
        allowedServingCells       SEQUENCE (SIZE (1..maxNrofServingCells-1)) OF ServCellIndex
                                                          OPTIONAL,     -- PDCP-CADuplication
        allowedSCS-List           SEQUENCE (SIZE (1..maxSCSs)) OF SubcarrierSpacing
                                                          OPTIONAL,     -- Need R
        maxPUSCH-Duration         ENUMERATED (ms0p02, ms0p04, ms0p0625, ms0p125, ms0p25,
                                   ms0p5, spare2, spare1)  OPTIONAL,    -- Need R
        configuredGrantType1Allowed ENUMERATED {true}      OPTIONAL,    -- Need R
        logicalChannelGroup       INTEGER (0..maxLCG-ID)   OPTIONAL,    -- Need R
        logicalChannelGroupOffset ENUMERATED {ms5, ms10, ms20, ms50, ms100, ms500, ms700,
                                   ms900, ms1000}
        schedulingRequestID       SchedulingRequestId      OPTIONAL,    -- Need R
        logicalChannelSR-Mask     BOOLEAN,
        logicalChannelSR-DelayTimerApplied                 BOOLEAN,
        ...,
        bitRateQueryProhibitTimer ENUMERATED { s0, s0dot4, s0dot8, s1dot6, s3, s6, s12, s30}
                                                          OPTIONAL      -- Need R
```

Table 2 illustrates, as an example, fixed values of the monitoring sleeping timer runtime. As indicated in the table, the runtime of the monitoring sleeping timer is indicated by X1 to X10, associated to LCGs with identifiers, IDs, 0 to 7, respectively. For instance, in a case where the level of priority decreases from LGC ID 0 to LCG ID 7, the runtime of the monitoring sleeping timer may increase from X1 to X10. In other words, the runtime of the monitoring sleeping timer may be larger the lower the level of the associated LCG is. Having the runtime/offset predefined does not require additional signaling.

TABLE 2

Fixed Value of Monitoring Sleeping Timer Runtime/Offset for Each LCG ID.

| LCG ID | Timer/offset |
|--------|--------------|
| 0 | X1 |
| 1 | X2 |
| 2 | X3 |
| 3 | X4 |
| 4 | X5 |
| 5 | X6 |
| 6 | X7 |
| 7 | X10 |

Alternatively or additionally, the runtime of the monitoring sleeping timer may be configured dynamically, for instance, by RRC. With dynamically configuring the mapping between LCG ID and the offset value/timer runtime, the In particular, the monitoring sleeping timer runtime is indicated by "logicalChannelGroupOffset" for each logical Channel Group.

In a case where the BSR indicated a plurality of amounts of scheduling data associated to different LCGs, the runtime of the monitoring timer may be set to the runtime associated with the highest priority logical channel group, for which an amount of scheduling data is indicated in the BSR. Alternatively, the runtime of the monitoring sleeping timer may be set to the runtime associated with the LCG having the lowest LCG ID. Alternatively, the runtime of the monitoring sleeping timer may be set to the shortest runtime associated to a LCG, for which an amount of scheduling data is indicated in the BSR.

Summarizing, according to embodiments of the present disclosure, a transceiver device like a UE 100 transmits a scheduling request or a buffer status report and, subsequently starts a dedicated timer, the monitoring sleeping timer. As long as this timer has not expired, the UE 100 does not monitor PDCCH for reception of an uplink grant. When the timer expires, the UE starts monitoring PDCCH. This may allow for a reduction of energy consumption, as while no scheduling grant is expected, the UE 100 does not monitor PDCCH.

A monitoring sleeping timer may be initiated after transmission of a scheduling request only, or after transmission of a buffer status report only, or after transmission of a scheduling request and after transmission of a buffer status report. In the last case, the runtime of the timer started after transmission of the SR may be equal to the runtime of the timer initiated after transmission of the BSR. However, the present disclosure is not limited thereto, and the runtime of the timer initiated after transmission of the SR may be different from the runtime of the timer initiated after transmission of the BSR.

Figure 23:
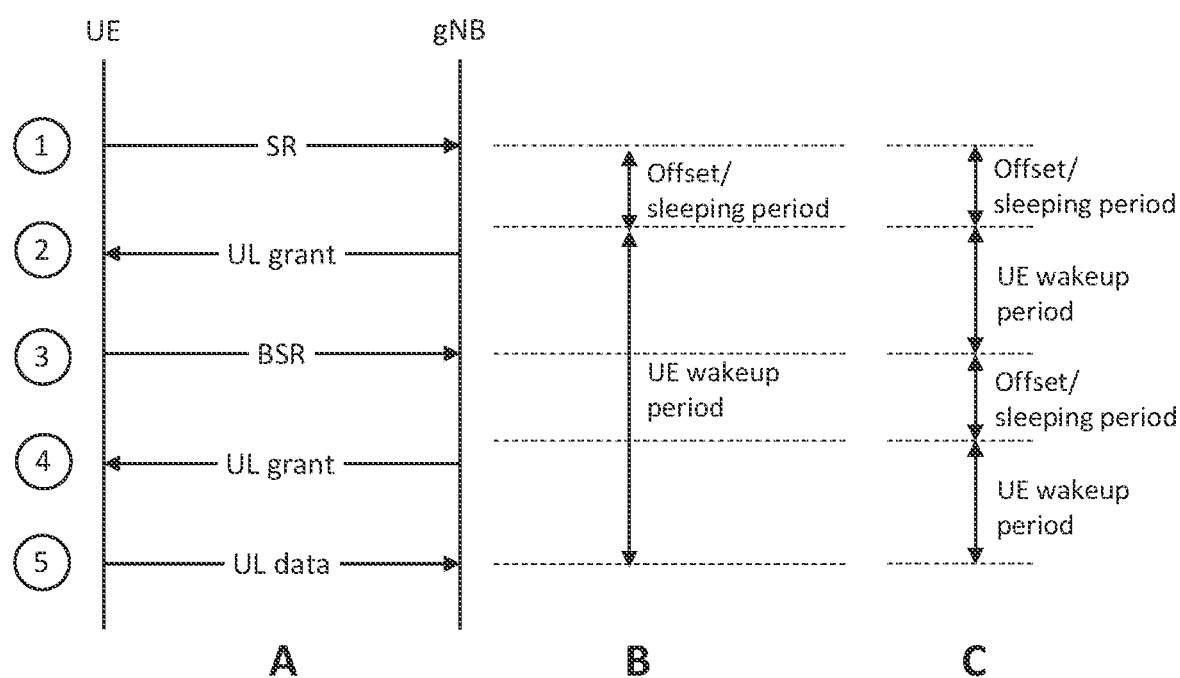
FIG. 23 illustrates steps of a scheduling request procedure, wherein a scheduling request and a buffer status report are transmitted and respective monitoring sleeping timers may be initiated.

An example of a scheduling request procedure, wherein a SR and a BSR are transmitted from UE 100 to gNB 200 is illustrated in FIG. 23A. In step 1, a scheduling request is transmitted by UE 100 to gNB 200 over a PUCCH. Further, in step 2, UE 100 receives a scheduling grant from gNB indicating resources for transmitting scheduling data. In step 3, UE 100 sends a buffer status report to gNB 200 using the indicated resources of a PUSCH. In step 4, UE 100 receives a scheduling grant for transmission of scheduling data from gNB 200. In step 5, UE 100 transmits the scheduling data using the resources indicated by the received uplink grant.

As illustrated in FIG. 23B, according to the present disclosure, UE 100 starts a monitoring sleeping timer after having transmitted the SR over the PUCCH and does not monitor PDCCH for reception of the uplink grant while the timer has not expired, i.e., in the period indicated as offset/sleeping period. After expiration of the monitoring sleeping timer, UE 100 monitors PDCCH in the period indicated as UE wakeup period for reception of an uplink grant.

Further, as illustrated in FIG. 23C, UE starts a monitoring sleeping timer after transmission of the BSR, i.e., after step 3, and does not monitor PDCCH while the monitoring sleeping timer has not expired, i.e., during the period indicated as offset/sleeping period. When the timer has expired, UE 1200 starts monitoring the PDCCH for reception of an uplink grant.

The UE 100 may start a monitoring sleeping timer after transmission of the SR, after transmission of the BSR, or after transmission of each. The runtime of the monitoring sleeping timer initiated after transmission of the SR may be equal or different from the runtime of the monitoring sleeping timer initiated after transmission of the BSR.

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

As described above, provided are devices and methods enabling providing flexible and power consumption reducing scheduling requests and indication of resource allocation.

Provided is a transceiver device, comprising a transceiver, which, in operation, transmits a scheduling request for scheduling data over a physical uplink control channel, PUCCH; and circuitry, which, in operation, initiates a monitoring sleeping timer after the transceiver transmitted the scheduling request, wherein the transceiver, in operation, does not monitor a physical downlink control channel, PDCCH, while the monitoring sleeping timer is running, and starts monitoring the PDCCH for resource allocation for the scheduling data when the monitoring sleeping timer has expired.

In some embodiments, the circuitry, in operation, initiates the monitoring sleeping timer when the scheduling request is transmitted by the transceiver.

In some embodiments, the transceiver, in operation, receives a monitoring sleeping indicator indicating a runtime of the monitoring sleeping timer; and the circuitry, in operation, initiates the monitoring sleeping timer when the monitoring sleeping indicator is received by the transceiver.

For example, the monitoring sleeping indicator indicates a runtime of the monitoring sleeping timer in terms of a time duration or a number of symbols and/or slots of the PDCCH.

In some embodiments, a runtime of the monitoring sleeping timer is configured according to a level of priority of a scheduling request configuration.

For example, a first runtime of the monitoring sleeping timer is configured for a first scheduling request configuration with a first level of priority; and a second runtime different from the first runtime of the monitoring sleeping timer is configured for a second scheduling request configuration with a second level of priority different from the first level of priority.

For example, in a case where the first level of priority is lower than the second level of priority, the first runtime is larger than the second runtime, and in a case where the first level of priority is higher than the second level of priority, the first runtime is less than the second runtime.

In some embodiments, the transceiver, in operation, receives a scheduling request configuration indicator indicating at least one scheduling request configuration with at least one associated level of priority.

For example, the transceiver, in operation, receives the scheduling request configuration indicator via a radio resource control, RRC, message.

In some embodiments, a discontinuous reception, DRX, cycle is configured, wherein the transceiver, in operation, monitors the PDCCH in active periods and does not monitor the PDCCH in inactive periods.

Further provided is a transceiver device, comprising a transceiver, which, in operation, transmits a buffer status report indicating at least an amount of scheduling data; and circuitry, which, in operation, initiates a monitoring sleeping timer after the transceiver transmitted the buffer status report, wherein the transceiver, in operation, does not monitor a physical downlink control channel, PDCCH, while the monitoring sleeping timer is running, and starts monitoring the PDCCH for resource allocation for the scheduling data when the monitoring sleeping timer has expired.

In some embodiments, the buffer status report is transmitted over a physical uplink shared channel, PUSCH.

In some embodiments, the circuitry, in operation, initiates the monitoring sleeping timer when the buffer status report is transmitted by the transceiver.

In some embodiments, the transceiver, in operation, receives a monitoring sleeping indicator indicating a runtime of the monitoring sleeping timer; and the circuitry, in operation, initiates the monitoring sleeping timer when the monitoring sleeping indicator is received by the transceiver.

In some embodiments, the monitoring sleeping indicator indicates a runtime of the monitoring sleeping timer in terms of a time duration or a number of symbols and/or slots of the PDCCH.

In some embodiments, a runtime of the monitoring sleeping timer is configured according to a logical channel group.

For instance, the buffer status report further indicates a logical channel group associated with the amount of scheduling data.

In some embodiments the buffer status report indicates a plurality of logical channel groups, each being associated with a respective amount of scheduling data.

For instance, each logical channel group is associated with a corresponding runtime of the monitoring sleeping timer.

For example, a runtime of the monitoring sleeping timer may be set to a runtime associated with the LCG having the highest level of priority.

In some embodiments, a first runtime of the monitoring sleeping timer is configured for a first logical channel group with a first level of priority, and a second runtime different from the first runtime of the monitoring sleeping timer is configured for a second logical channel group with a second level of priority different from the first level of priority.

For example, in a case where the first level of priority is lower than the second level of priority, the first runtime is larger than the second runtime, and in a case where the first level of priority is higher than the second level of priority, the first runtime is less than the second runtime.

In some embodiments, the transceiver, in operation, receives a logical channel group runtime indicator indicating at least one logical channel group with an associated runtime of the monitoring sleeping timer.

For example, the transceiver, in operation, receives the logical channel group runtime indicator via a radio resource control, RRC, message.

In some embodiments, a discontinuous reception, DRX, cycle is configured, wherein the transceiver, in operation, monitors the PDCCH in active periods and does not monitor the PDCCH in inactive periods.

Further provided is a scheduling device, comprising circuitry, which, in operation, allocates resources according to a scheduling request for scheduling data, initiates a transmission timer, and the transceiver, which, in operation, receives the scheduling request over a physical uplink control channel, PUCCH, and transmits a resource allocation indicator indicating the allocated resources over a physical downlink control channel, PDCCH, after the transmission timer has expired.

In some embodiments, the circuitry, in operation, determines a runtime of a monitoring sleeping timer; and the transceiver, in operation, transmits a monitoring sleeping indicator indicating the runtime of the monitoring sleeping timer.

For example, a runtime of the transmission timer is equal to a runtime of the monitoring sleeping timer.

Further provided is a scheduling device, comprising circuitry, which, in operation, allocates resources according to a buffer status report indicating an amount of scheduling data, initiates a transmission timer, and a transceiver, which, in operation, receives the buffer status report, and transmits a resource allocation indicator indicating the allocated resources over a physical downlink control channel, PDCCH, after the transmission timer has expired.

For example, the transceiver receives the buffer status report over a physical uplink shared channel, PUSCH.

In some embodiments, the circuitry, in operation, determines a runtime of a monitoring sleeping timer; and the transceiver, in operation, transmits a monitoring sleeping indicator indicating the runtime of the monitoring sleeping timer.

For example, a runtime of the transmission timer is equal to a runtime of the monitoring sleeping timer.

In some embodiments, the circuitry, in operation, determines a runtime of a monitoring sleeping timer according to a logical channel group.

For instance, the buffer status report further indicates a logical channel group associated with the amount of scheduling data.

In some embodiments the buffer status report indicates a plurality of logical channel groups, each being associated with a respective amount of scheduling data.

For instance, each logical channel group is associated with a corresponding runtime of the monitoring sleeping timer.

In some embodiments, a first runtime of the monitoring sleeping timer is configured for a first logical channel group with a first level of priority, and a second runtime different from the first runtime of the monitoring sleeping timer is configured for a second logical channel group with a second level of priority different from the first level of priority.

For example, in a case where the first level of priority is lower than the second level of priority, the first runtime is larger than the second runtime, and in a case where the first level of priority is higher than the second level of priority, the first runtime is less than the second runtime.

In some embodiments, the transceiver, in operation, transmits a logical channel group runtime indicator indicating at least one logical channel group with an associated runtime of the monitoring sleeping timer.

For example, the transceiver, in operation, transmits the logical channel group runtime indicator via a radio resource control, RRC, message.

Further provided is a method, comprising transmitting a scheduling request for scheduling data over a physical uplink control channel, PUCCH, initiating a monitoring sleeping timer after transmission of the scheduling request; prevent monitoring of a physical downlink control channel, PDCCH, while the monitoring sleeping timer is running; and start monitoring the PDCCH for resource allocation for the scheduling data when the monitoring sleeping timer has expired.

In some embodiments, the monitoring sleeping timer is initiated when the scheduling request is transmitted.

In some embodiments, a monitoring sleeping indicator indicating a runtime of the monitoring sleeping timer is received; and the monitoring sleeping timer is initiated when the monitoring sleeping indicator is received;

For example, the monitoring sleeping indicator indicates a runtime of the monitoring sleeping timer in terms of a time duration or a number of symbols and/or slots of the PDCCH.

In some embodiments, a runtime of the monitoring sleeping timer is configured according to a level of priority of a scheduling request configuration.

For example, a first runtime of the monitoring sleeping timer is configured for a first scheduling request configuration with a first level of priority; and a second runtime different from the first runtime of the monitoring sleeping timer is configured for a second scheduling request configuration with a second level of priority different from the first level of priority.

For example, in a case where the first level of priority is lower than the second level of priority, the first runtime is larger than the second runtime, and in a case where the first level of priority is higher than the second level of priority, the first runtime is less than the second runtime.

In some embodiments, a scheduling request configuration indicator indicating at least one scheduling request configuration with at least one associated level of priority is received, For example, the scheduling request configuration indicator is received via a radio resource control, RRC, message.

In some embodiment, a discontinuous reception, DRX, cycle is configured, wherein the PDCCH is monitored in active periods and the PDCCH is not monitored in inactive periods.

Further provided is a method, comprising transmitting a buffer status report indicating an amount of scheduling data; initiating a monitoring sleeping timer after transmission of the buffer status report; prevent monitoring a physical downlink control channel, PDCCH, while the monitoring sleeping timer is running; and start monitoring the PDCCH for resource allocation for the scheduling data when the monitoring sleeping timer has expired.

In some embodiments, the buffer status report is transmitted over a physical uplink shared channel, PUSCH.

In some embodiments, the monitoring sleeping timer is initiated when the buffer status report is transmitted.

In some embodiments, the method comprises receiving a monitoring sleeping indicator indicating a runtime of the monitoring sleeping timer; and initiating the monitoring sleeping timer when the monitoring sleeping indicator is received.

In some embodiments, the monitoring sleeping indicator indicates a runtime of the monitoring sleeping timer in terms of a time duration or a number of symbols and/or slots of the PDCCH.

In some embodiments, a runtime of the monitoring sleeping timer is configured according to a logical channel group.

For instance, the buffer status report further indicates a logical channel group associated with the amount of scheduling data.

In some embodiments the buffer status report indicates a plurality of logical channel groups, each being associated with a respective amount of scheduling data.

For instance, each logical channel group is associated with a corresponding runtime of the monitoring sleeping timer.

For example, a runtime of the monitoring sleeping timer may be set to a runtime associated with the LCG having the highest level of priority.

In some embodiments, a first runtime of the monitoring sleeping timer is configured for a first logical channel group with a first level of priority, and a second runtime different from the first runtime of the monitoring sleeping timer is configured for a second logical channel group with a second level of priority different from the first level of priority.

For example, in a case where the first level of priority is lower than the second level of priority, the first runtime is larger than the second runtime, and in a case where the first level of priority is higher than the second level of priority, the first runtime is less than the second runtime.

In some embodiments, the method comprises receiving a logical channel group runtime indicator indicating at least one logical channel group with an associated runtime of the monitoring sleeping timer.

For example, the logical channel group runtime indicator is received via a radio resource control, RRC, message.

In some embodiments, a discontinuous reception, DRX, cycle is configured, wherein the PDCCH is monitored in active periods and the PDCCH is not monitored in inactive periods.

Further provided is a method, comprising receiving a scheduling request for scheduling data over a physical uplink control channel, PUCCH; initiating a transmission timer; allocating resources according to the scheduling request; and transmitting a resource allocation indicator indicating the allocated resources over a physical downlink control channel, PDCCH, after the transmission timer has expired.

In some embodiments, a runtime of a monitoring sleeping timer is determined; and a monitoring sleeping indicator indicating the runtime of the monitoring sleeping timer is transmitted.

For example, a runtime of the transmission timer is equal to the runtime of the monitoring sleeping timer.

Further provided is a method, comprising receiving a buffer status report indicating an amount of scheduling data; initiating a transmission timer; allocating resources according to the buffer status report; and transmitting a resource allocation indicator indicating the allocated resources over a physical downlink control channel, PDCCH, after the transmission timer has expired.

For example, the transceiver receives the buffer status report over a physical uplink shared channel, PUSCH.

In some embodiments, the method comprises determining a runtime of a monitoring sleeping timer; and transmitting a monitoring sleeping indicator indicating the runtime of the monitoring sleeping timer.

For example, a runtime of the transmission timer is equal to a runtime of the monitoring sleeping timer.

In some embodiments, the method comprises determining a runtime of a monitoring sleeping timer according to a logical channel group.

For instance, the buffer status report further indicates a logical channel group associated with the amount of scheduling data.

In some embodiments the buffer status report indicates a plurality of logical channel groups, each being associated with a respective amount of scheduling data.

For instance, each logical channel group is associated with a corresponding runtime of the monitoring sleeping timer.

In some embodiments, a first runtime of the monitoring sleeping timer is configured for a first logical channel group with a first level of priority, and a second runtime different from the first runtime of the monitoring sleeping timer is configured for a second logical channel group with a second level of priority different from the first level of priority.

For example, in a case where the first level of priority is lower than the second level of priority, the first runtime is larger than the second runtime, and in a case where the first level of priority is higher than the second level of priority, the first runtime is less than the second runtime.

In some embodiments, the method comprises transmitting a logical channel group runtime indicator indicating at least one logical channel group with an associated runtime of the monitoring sleeping timer.

For example, the logical channel group runtime indicator is transmitted via a radio resource control, RRC, message.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transceiver device, comprising
a transceiver, which, in operation, transmits a scheduling request (SR) over a physical uplink control channel (PUCCH), wherein the SR is pending until a valid uplink grant is received; and
circuitry, which, when the SR is transmitted by the transceiver, initiates a monitoring sleeping time, wherein
the transceiver, in operation, receives information on a first time duration via a radio resource control (RRC) signaling different from a discontinuous reception (DRX) configuration and receives information on a second time duration via a medium access control (MAC) control element;
the monitoring sleeping time has a total time duration of the first time duration and the second time duration, and
the transceiver, in operation, starts an active time to monitor a physical downlink control channel (PDCCH) after the SR transmission plus the monitoring sleeping time.

2. The transceiver device according to claim 1, wherein
the transceiver, in operation, receives a monitoring sleeping indicator indicating a runtime of the monitoring sleeping time; and
the circuitry, in operation, initiates the monitoring sleeping time when the monitoring sleeping indicator is received by the transceiver.

3. The transceiver device according to claim 2, wherein the monitoring sleeping indicator indicates the runtime of the monitoring sleeping time in terms of the time duration, or a number of symbols and/or slots of the PDCCH.

4. The transceiver device according to claim 1, wherein a runtime of the monitoring sleeping time is configured according to a level of priority of a scheduling request configuration.

5. The transceiver device according to claim 4, wherein,
a first runtime of the monitoring sleeping time is configured for a first scheduling request configuration with a first level of priority; and
a second runtime different from the first runtime of the monitoring sleeping time is configured for a second scheduling request configuration with a second level of priority different from the first level of priority.

6. The transceiver device according to claim 5, wherein
in a case where the first level of priority is lower than the second level of priority, the first runtime is larger than the second runtime, and
in a case where the first level of priority is higher than the second level of priority, the first runtime is less than the second runtime.

7. The transceiver device according to claim 4, wherein the transceiver, in operation, receives a scheduling request configuration indicator indicating at least one scheduling request configuration with at least one associated level of priority.

8. The transceiver device according to claim 7, wherein the transceiver, in operation, receives the scheduling request configuration indicator via the RRC signaling.

9. The transceiver device according to claim 1, wherein the DRX cycle is configured, wherein the transceiver, in operation, monitors the PDCCH in active periods and does not monitor the PDCCH in inactive periods.

10. The transceiver device according to claim 1, wherein a time duration of the monitoring sleeping time is configured in milliseconds.

11. A scheduling device, comprising
a transceiver, which, in operation,
receives a scheduling request (SR) over a physical uplink control channel (PUCCH) from a transceiver device, wherein the SR is pending until a valid uplink grant is transmitted over a physical downlink control channel (PDCCH) to the transceiver device, and
transmits information on a first time duration via a radio resource control (RRC) signaling different from a discontinuous reception (DRX) configuration and transmits information on a second time duration via a medium access control (MAC) control element;

wherein the transceiver device, when the SR is transmitted, initiates a monitoring sleeping time which has a total duration of the first time duration and the second time duration, and starts an active time to monitor the PDCCH after the SR transmission plus the monitoring sleeping time, and circuitry, which, in operation, allocates resources based on the SR.

12. The scheduling device according to claim 11, wherein the circuitry, in operation, determines a runtime of the monitoring sleeping time; and the transceiver, in operation, transmits a monitoring sleeping indicator indicating the runtime of the monitoring sleeping time.

13. The scheduling device according to claim 12, wherein the monitoring sleeping indicator indicates the runtime of the monitoring sleeping time is indicated in terms of the time duration, or a number of symbols and/or slots of the PDCCH.

14. The scheduling device according to claim 11, wherein a time duration of the monitoring sleeping time is configured in milliseconds.

15. A method, comprising transmitting a scheduling request (SR) over a physical uplink control channel (PUCCH), wherein the SR is pending until a valid uplink grant is received, initiating a monitoring sleeping time when the SR is transmitted, receiving information on a first time duration via a radio resource control (RRC) signaling different from a discontinuous reception (DRX) configuration and receiving information on a second time duration via a medium access control (MAC) control element, wherein the monitoring sleeping time has a total time duration of the first time duration and the second time duration; and starting an active time to monitor a physical downlink control channel (PDCCH) after the SR transmission plus the monitoring sleeping time.

16. The method according to claim 15, wherein a time duration of the monitoring sleeping time is configured in milliseconds.

* * * * *